(12) United States Patent
Hamkens et al.

(10) Patent No.: US 12,427,455 B2
(45) Date of Patent: Sep. 30, 2025

(54) FILTER ARRANGEMENT AND HALF COUPLING ELEMENT COMPRISING A FILTER ARRANGEMENT

(71) Applicant: Stäubli Hamburg GmbH, Norderstedt (DE)

(72) Inventors: Hauke Peter Hamkens, Oldenswort (DE); Eugen Schwarz, Hamburg (DE); David Worseg, Henstedt-Ulzburg (DE)

(73) Assignee: Stäubli Hamburg GmbH, Norderstedt (DE)

( * ) Notice: Subject to any disclaimer, the term of this patent is extended or adjusted under 35 U.S.C. 154(b) by 11 days.

(21) Appl. No.: 18/409,335

(22) Filed: Jan. 10, 2024

(65) Prior Publication Data
US 2024/0226786 A1 Jul. 11, 2024

(30) Foreign Application Priority Data
Jan. 11, 2023 (EP) .................................. 23 151 195.7

(51) Int. Cl.
*B01D 35/30* (2006.01)
*B01D 35/027* (2006.01)

(52) U.S. Cl.
CPC .......... *B01D 35/30* (2013.01); *B01D 35/027* (2013.01); *B01D 2201/0461* (2013.01); *B01D 2201/4015* (2013.01)

(58) Field of Classification Search
None
See application file for complete search history.

(56) References Cited

U.S. PATENT DOCUMENTS

| | | | | |
|---|---|---|---|---|
| 549,390 | A | * 11/1895 | Patterson et al. .... | B01D 35/005 |
| | | | | 210/447 |
| 748,821 | A | * 1/1904 | Wackerow ........... | B01D 35/153 |
| | | | | 210/411 |
| 751,918 | A | * 2/1904 | Jagger ................... | B01D 35/02 |
| | | | | 210/454 |
| 852,584 | A | * 5/1907 | Skinner ................. | B01D 35/30 |
| | | | | 285/133.4 |

(Continued)

FOREIGN PATENT DOCUMENTS

| | | |
|---|---|---|
| DE | 202009001239 U1 | 7/2010 |
| EP | 3230646 B1 | 5/2018 |

(Continued)

*Primary Examiner* — Robert J Popovics
(74) *Attorney, Agent, or Firm* — Dinsmore & Shohl LLP

(57) ABSTRACT

A filter arrangement has a first body member with a first axial front surface and a first radial sealing surface, a second body member with a second axial front surface and a second radial sealing surface, a contact portion and an elastic contact element. The first and second body members complementarily couple together with a connecting device. In a coupled state, the contact portion and the elastic contact element are axially compressed between the first and second axial front surface. The second radial sealing surface has a groove housing a first sealing element. When brought into the coupled state, the first radial sealing surface at least partially covers the groove of the second radial sealing surface before the contact portion and elastic contact element are at least partially axially compressed between the first and second axial front surface. When coupled, the first radial sealing surface completely covering the groove.

15 Claims, 10 Drawing Sheets

(56) References Cited

U.S. PATENT DOCUMENTS

| | | | | |
|---|---|---|---|---|
| 872,437 A * | 12/1907 | Leonard | B01D 29/01 | 285/354 |
| 881,483 A * | 3/1908 | Olsen et al. | A47L 9/1683 | 55/482 |
| 979,481 A * | 12/1910 | Hannold | F16L 55/24 | 210/448 |
| 1,436,294 A * | 11/1922 | Scott | B60K 15/0406 | 210/473 |
| 1,458,464 A * | 6/1923 | De Forest | B01D 35/02 | 210/497.3 |
| 1,585,418 A * | 5/1926 | Rosenberg | B01D 35/02 | 210/485 |
| 1,835,429 A * | 12/1931 | Rice | F16L 55/24 | 210/497.3 |
| 1,888,150 A * | 11/1932 | Walker | B01D 46/10 | 55/486 |
| 1,961,498 A * | 6/1934 | Krueger | B01D 35/02 | 210/497.3 |
| 1,971,120 A * | 8/1934 | Hubert | F16L 35/00 | 210/497.3 |
| 2,019,094 A * | 10/1935 | Rice | B01D 35/02 | 210/497.3 |
| 2,068,837 A * | 1/1937 | Aronson | B01D 35/02 | 55/482 |
| 2,068,858 A * | 1/1937 | Jones | B01D 46/0012 | 55/482 |
| 2,073,991 A * | 3/1937 | Koser | B01D 29/05 | 210/489 |
| 2,192,968 A * | 3/1940 | Fieser | B01D 46/10 | 55/486 |
| 2,384,057 A * | 9/1945 | Wetherell | B01D 35/02 | 210/489 |
| 2,491,796 A * | 12/1949 | Baume | F16L 55/24 | 210/497.3 |
| 2,647,636 A * | 8/1953 | Rafferty | B01D 35/023 | 210/446 |
| 2,658,625 A * | 11/1953 | Rafferty | B01D 35/02 | 210/497.3 |
| 2,679,407 A * | 5/1954 | Badger, Jr. | B65B 39/00 | 251/89.5 |
| 2,697,523 A * | 12/1954 | Romke | B01D 46/48 | 210/166 |
| 2,747,682 A * | 5/1956 | Hendry | F16L 55/24 | 55/436 |
| 2,779,478 A * | 1/1957 | Wahlin | B21B 45/08 | 210/462 |
| 2,861,690 A * | 11/1958 | Shaw | B01D 29/23 | 210/313 |
| 2,915,188 A * | 12/1959 | Buker | F16L 55/24 | 220/318 |
| 2,963,282 A * | 12/1960 | Scheibe | F02M 69/04 | 261/76 |
| 3,109,459 A * | 11/1963 | Lee, II | F15B 21/00 | 138/40 |
| 3,245,703 A * | 4/1966 | Manly | F16L 37/0847 | 285/347 |
| 3,280,982 A * | 10/1966 | Barto | F16L 55/24 | 210/446 |
| 3,374,673 A * | 3/1968 | Trageser | G01F 1/44 | 73/202 |
| 3,429,448 A * | 2/1969 | Rosell | F16L 37/53 | 285/321 |
| 3,458,050 A * | 7/1969 | Cooper | B01D 35/02 | 210/493.2 |
| 3,474,911 A * | 10/1969 | Olsen | B01D 37/02 | 210/318 |
| 3,592,768 A * | 7/1971 | Parker | F16L 55/24 | 210/495 |
| 3,622,006 A * | 11/1971 | Brunner | B01D 35/14 | 210/448 |
| 3,731,815 A * | 5/1973 | Collingwood | B01D 35/023 | 210/497.2 |
| 3,794,180 A * | 2/1974 | Blocker | B01D 35/02 | 210/446 |
| 3,841,489 A * | 10/1974 | Combest | F02M 27/045 | 210/223 |
| 3,941,697 A * | 3/1976 | Johnson | F28F 19/01 | 210/463 |
| 4,052,308 A * | 10/1977 | Higgs | B01D 35/02 | 210/448 |
| 4,052,315 A * | 10/1977 | Lindsay, Jr. | B01D 29/111 | 264/DIG. 48 |
| 4,495,073 A * | 1/1985 | Beimgraben | B01D 35/02 | 166/227 |
| 4,527,745 A * | 7/1985 | Butterfield | B05B 15/658 | 285/376 |
| 4,550,896 A * | 11/1985 | Hansen, III | F16K 27/029 | 251/366 |
| 4,582,605 A * | 4/1986 | Rea | B01D 29/35 | 210/450 |
| 4,707,262 A * | 11/1987 | Murken | B01D 29/15 | 285/305 |
| 4,806,248 A * | 2/1989 | Murken | B01D 29/96 | 285/305 |
| 4,839,038 A * | 6/1989 | McLain, II | B01D 29/15 | 73/202 |
| 4,894,156 A * | 1/1990 | Murken | B01D 29/23 | 285/305 |
| 5,252,210 A * | 10/1993 | Kessel | B01D 29/23 | 55/525 |
| 5,281,331 A * | 1/1994 | Golan | F01P 11/06 | 210/167.01 |
| 5,490,868 A * | 2/1996 | Whitlock | B01D 29/114 | 55/504 |
| 5,492,143 A * | 2/1996 | Cooper | B01D 35/157 | 137/550 |
| 5,536,402 A * | 7/1996 | Kluhsman | B01D 35/02 | 210/232 |
| 5,545,318 A * | 8/1996 | Richmond | B01D 29/15 | 210/232 |
| 5,862,667 A * | 1/1999 | Prince | F02C 7/22 | 60/734 |
| 5,951,728 A * | 9/1999 | Hopson | B01D 46/0012 | 55/482 |
| 5,972,059 A * | 10/1999 | Morgan | B01D 46/58 | 55/508 |
| 6,116,274 A * | 9/2000 | Ehrlich | F16K 37/0058 | 137/550 |
| 6,171,327 B1 * | 1/2001 | Daniel | A61F 2/0108 | 606/159 |
| 6,461,506 B1 * | 10/2002 | Bradford | B01D 29/94 | 210/488 |
| 6,605,217 B2 * | 8/2003 | Buhr | B01D 63/089 | 210/450 |
| 6,830,062 B2 * | 12/2004 | Montpetit | F16K 21/02 | 239/533.13 |
| 6,955,266 B2 * | 10/2005 | Ballet | B01D 29/668 | 210/433.1 |
| 7,063,783 B2 * | 6/2006 | Ballet | B01D 29/668 | 210/463 |
| 7,143,898 B1 * | 12/2006 | Hoaglin | B01D 35/02 | 210/448 |
| RE40,481 E * | 9/2008 | Borla | B01D 46/2403 | 55/497 |
| 7,510,084 B2 * | 3/2009 | Bishop | B07B 7/06 | 209/315 |
| 8,182,702 B2 * | 5/2012 | Al-Sannaa | B01D 35/02 | 210/806 |
| 8,282,700 B2 * | 10/2012 | Walz | F16L 55/24 | 55/498 |
| 8,393,898 B2 * | 3/2013 | McCary | A61C 17/065 | 433/91 |
| 8,534,467 B2 * | 9/2013 | Haas | E03B 7/07 | 285/354 |
| 9,016,314 B2 * | 4/2015 | Eriksen | H05K 7/20763 | 137/614.04 |
| 9,781,886 B1 * | 10/2017 | Wangsgaard | F16L 37/0985 | |
| 9,797,355 B2 * | 10/2017 | Reinhardt | F02M 55/025 | |

(56) References Cited

U.S. PATENT DOCUMENTS

| | | | | |
|---|---|---|---|---|
| 10,441,902 B2* | 10/2019 | Tange | ............... | B01D 29/11 |
| 10,927,347 B2* | 2/2021 | Pilkington | ............ | A61M 1/892 |
| 11,054,074 B2* | 7/2021 | Heon | ............... | F16L 37/008 |
| 11,224,830 B2* | 1/2022 | Wildermuth | ........... | B01D 29/96 |
| 11,912,213 B2* | 2/2024 | Van Beek | ............... | E03D 9/10 |
| 11,969,675 B2* | 4/2024 | Okuno | ............... | B01D 29/902 |
| 12,239,927 B2* | 3/2025 | Trask | ............... | B01D 24/38 |
| 2003/0181943 A1* | 9/2003 | Daniel | ............... | A61F 2/0108 |
| | | | | 606/200 |
| 2004/0144105 A1* | 7/2004 | Ballet | ............... | B01D 29/117 |
| | | | | 62/85 |
| 2005/0120511 A1* | 6/2005 | Pedersen | ............... | A45D 24/32 |
| | | | | 15/402 |
| 2005/0145551 A1* | 7/2005 | Ballet | ............... | B01D 29/668 |
| | | | | 210/175 |
| 2006/0272994 A1* | 12/2006 | Erdman | ............... | B01D 35/30 |
| | | | | 210/232 |
| 2008/0257815 A1* | 10/2008 | McCary | ............... | A61C 17/125 |
| | | | | 210/416.1 |
| 2010/0116732 A1* | 5/2010 | Jung | ............... | B01D 35/02 |
| | | | | 210/447 |
| 2010/0155345 A1* | 6/2010 | Al-Sannaa | ............ | B01D 35/02 |
| | | | | 210/806 |
| 2010/0192777 A1* | 8/2010 | Walz | ............... | F16L 55/24 |
| | | | | 96/423 |
| 2011/0114195 A1* | 5/2011 | Haas | ............... | F16L 55/24 |
| | | | | 137/15.01 |
| 2011/0132817 A1* | 6/2011 | Gardner | ............... | B01D 29/23 |
| | | | | 210/411 |
| 2014/0001744 A1* | 1/2014 | Haas | ............... | B01D 35/02 |
| | | | | 285/5 |
| 2016/0333305 A1* | 11/2016 | Pilkington | ............ | C12M 45/02 |
| 2018/0001235 A1* | 1/2018 | Tange | ............... | B01D 29/902 |
| 2018/0354432 A1* | 12/2018 | Van Beek | ............... | B60R 15/00 |
| 2020/0054973 A1* | 2/2020 | Wildermuth | ........... | B01D 35/02 |
| 2021/0113951 A1* | 4/2021 | Oh | ............... | B01D 46/71 |
| 2021/0130783 A1* | 5/2021 | Pilkington | ............ | C12M 45/02 |
| 2023/0405499 A1* | 12/2023 | Trask | ............... | B01F 27/113 |
| 2024/0226786 A1* | 7/2024 | Hamkens | ............... | B01D 29/23 |
| 2025/0170505 A1* | 5/2025 | Trask | ............... | B01F 27/113 |

FOREIGN PATENT DOCUMENTS

| | | | | |
|---|---|---|---|---|
| EP | 3230647 B1 | 8/2018 | | |
| EP | 3230648 B1 | 10/2018 | | |
| EP | 3230645 B1 | 4/2019 | | |
| EP | 4400195 A1 * | 7/2024 | ............ | B01D 29/23 |

* cited by examiner

FILTER ARRANGEMENT AND HALF COUPLING ELEMENT COMPRISING A FILTER ARRANGEMENT

CROSS REFERENCE TO RELATED APPLICATION

This application claims priority to European Application No. 23 151 195.7, filed Jan. 11, 2023, which is hereby incorporated by reference in its entirety.

FIELD OF THE INVENTION

The invention relates to a filter arrangement, comprising a first body member having a forward portion and a rearward portion delimiting a first fluid conduit, the first body member comprising a first axial front surface and a first radial sealing surface, a second body member having a forward portion and a rearward portion delimiting a second fluid conduit, the second body member comprising a second axial front surface and a second radial sealing surface, at least one filter element and at least one contact portion, wherein the at least one contact portion is adapted and configured to be longitudinally secured to the at least one filter element, at least one elastic contact element which is elastically deformable, the first body member and the second body member being adapted and configured to be complementarily coupled together along a longitudinal axis of the filter arrangement with a bayonet connecting device, the bayonet connecting device having at least one bayonet pin and at least one bayonet slot, wherein the at least one bayonet pin is longitudinally secured with one of the first body member or the second body member, and the at least one bayonet slot is arranged on the other of the second body member or the first body member and is configured and adapted to receive the at least one bayonet pin, wherein the at least one bayonet slot comprises a bayonet entrance and a circumferential notch, wherein, in a coupled state of the filter arrangement, the bayonet pin is engaged with a forward wall of the circumferential notch of the bayonet slot to lock a longitudinal displacement of the first body member relative to the second body member, wherein, in the coupled state, a longitudinal fluid conduit is formed by the first fluid conduit and the second fluid conduit and wherein the filter element is disposed in the longitudinal fluid conduit.

The invention further relates to a half coupling element comprising a coupling body member and a filter arrangement.

BACKGROUND OF THE INVENTION

Filter arrangements comprising a first body member and a second body member delimiting a fluid conduit are known from the prior art. It is also known from the prior art that such body members are designed to be connectable to each other. Numerous different filter devices are known in the prior art which are designed to be inserted into fluid conduits which are formed by corresponding body members.

Coupling elements or filter arrangements are used, for example, for tank filling in the military or civilian sector. The main applications for those coupling elements or filter arrangements comprising filters are airfield and military tank filling. For airfield and military tank filling applications, it is important that no part of the filter arrangement can be lost because it could damage the jet engines. In such applications, the fluid flowing through the filter arrangement may have a pressure of maximal 10 bar and a temperature between −40° C. and 60° C.

From U.S. Pat. No. 4,527,745 a fluid transfer system to spray nozzles and piping assemblies is known. The fluid transport system comprises a body member and a spray tip, which can be connected to each other by a bayonet fitting. One object of the prior art lies in the quick mounting and dismounting of spray tips. U.S. Pat. No. 4,527,745 also shows a strainer. The strainer forms a radial flange at a lower end, which is seated in a complementary groove formed by the lower end of the body member. The fluid transport system includes an annular gasket longitudinally disposed between the annularly beaded end of the body member and the spray tip. The bayonet fitting comprises bayonet pins that enter into bayonet slots provided on the body member, compressing the gasket longitudinally to create a sealing effect between the body member and the spray tip. In the coupled state, the strainer is disposed in the longitudinal fluid conduit of the fluid transport system. The known prior art has a multitude of disadvantages which occur especially during the coupling process and are in particular caused by the design of the sealing.

The bayonet fitting disclosed in U.S. Pat. No. 4,527,745 progressively increases the force exerted during the coupling process, as the gasket is provided with a non-linear elasticity in order to maintain a high sealing level at low temperatures (e.g., below −30° C.). The bayonet fitting is also directly linked to elasticity of the gasket. The bayonet slot is provided with a circumferential notch having a recess to avoid uncoupling if the gasket material properties change, which means a longitudinal overrun during the bayonet coupling, and thus additional high level coupling efforts for the operator.

SUMMARY OF THE INVENTION

While the prior art provides a large number of bayonet-type quick-connect fittings in conjunction with a fluid conduit, they regularly cause problems or disadvantages for the operator. The existing solutions also experience sealing problems and/or are difficult or impractical to use.

Therefore, it is an object of the present invention to provide a filter arrangement which, on the one hand, ensures a convenient and reliable mounting and dismounting of a filter and, on the other hand, offers a constant sealing in a coupled state of the filter arrangement, in particular at different pressures or temperature ranges. Another object of the present invention is to propose a half coupling element comprising a corresponding filter arrangement.

This object is achieved by the filter arrangement mentioned hereinbefore, wherein in the coupled state, the at least one contact portion and the at least one elastic contact element are axially compressed between the first axial front surface and the second axial front surface, the at least one elastic contact element being at least partially elastically deformed and in longitudinal contact with the at least one contact portion, and wherein the filter arrangement further comprises a first sealing element that is received in a groove of the second radial sealing surface of the second body member, wherein the first body member and the second body member are configured and adapted such that, when the filter arrangement is brought into the coupled state, the first radial sealing surface at least partially covers the groove of the second radial sealing surface before the at least one contact portion and the at least one elastic contact element are at least partially axially compressed between the first axial front surface and the second axial front surface, and wherein, in the coupled state, the first sealing element is configured and adapted to seal the longitudinal fluid conduit by radial cooperation with the first radial sealing surface and with the second radial sealing surface, the first radial sealing surface completely covering the groove.

The first body member and the second body member are preferably both tubular around a longitudinal axis. "Longitudinal" or "axial" refers to the longitudinal axis of the corresponding body member. "Radial surface" means a surface extending around the longitudinal axis of the corresponding body member. The "radial direction" or "radially" refers to a direction perpendicular to the longitudinal axis of the corresponding body member. The "longitudinal direction" or "longitudinally" or "axially" refers to a direction parallel to longitudinal axis of the corresponding body member. The "circumferential direction" refers to a direction around the longitudinal axis of the corresponding body member. "Inner" or "internal" is oriented radially toward the longitudinal axis of the corresponding body member whereas "outer" or "outward" or "external" is turned radially at the opposite of the longitudinal axis of the corresponding body member. "Forward" refers to the longitudinal direction which is turned toward the other body member at the beginning of the bayonet coupling. "Rearward" is the opposite longitudinal direction.

The filter arrangement according to the invention ensures that a reliable and secure coupling of the first and second body members is provided by the coupling device. Due to the at least partial axial compression between the first axial front surface and the second axial front surface, the at least one contact portion and the at least one elastic contact element are compressed at least partially longitudinally, i.e., in the longitudinal extension along the contact portion and along the elastic contact element, respectively. The assembly formed by the contact portion and the elastic contact element can preferably also be referred to as a stack, whereby the contact portion and the elastic contact element are longitudinally in contact with each other. For the axial compression of the stack between the first axial front surface and the second axial front surface, the elastic contact element elastically deforms itself with regard to a free state. The radial seal being out of the stack thus provided ensures that the sealing between the first body member and the second body member is less temperature-dependent, since it is not affected by variations in the material of the stack. As a result of the radial sealing between the two body members, the tightening coupling efforts (radial compression of the first sealing element) and the bayonet coupling efforts (deformation of at least the elastic contact element) can be sequenced during coupling. The assembly (stack) of the contact section and the elastic contact element also provide better feedback on whether the first sealing element is properly compressed or not. Compression of the first sealing element creates friction that resists the backward movement of the at least one bayonet pin towards the entrance of the at least one bayonet slot if the operator stops or reduces his coupling efforts during bayonet coupling before the at least one bayonet pin enters the circumferential notch. The groove and the second front axial surface are formed on the same body (=second body member), i.e., without possibility of relative movement, the first radial sealing surface and the first front axial surface are formed on the same body (=first body member), i.e., without possibility of relative movement, which allows precise control of the stack compression. In preferred embodiments, all parts (except the first sealing element and the second sealing element) of the filter arrangement are made of metal, which limits the influence of temperature variations on the material properties. The material of the first body member and/or the second body member is particularly preferably aluminium, as it is, among other things, lightweight and at the same time durable and long-lasting.

The first sealing element is further preferably designed as an O-ring. In another embodiment (not shown on the figures), the first sealing element is a X-ring or a lip seal or any suitable gasket. In a preferred embodiment, the first sealing element has a minor radius which is equal to around 5% of the diameter of the second radial sealing surface, preferably between 4% and 6% of the diameter of the second radial sealing surface. The material of the first sealing element is preferably an elastomer, which can be, for example, nitrile rubber or perfluoroelastomer or a fluorocarbon-based fluoroelastomer. The filter arrangement can preferably be integrated in a hose unit and may further preferably be interposed between the hose and a half coupling element with a valve, this half coupling element being releasably connected to/disconnected from a complementary half coupling element of a source of fluid supply. In alternative, the filter arrangement can preferably be integrated in a tank unit. In preferred embodiments, the coupling element may be designed according to NATO STANAG 3756 or according to NATO STANAG 3105/ISO45, for example.

The forward portions of the respective body members preferably comprise the elements of the coupling device, the at least one bayonet pin and the at least one bayonet slot. The forward portion of the first body member and the forward portion of the second body member are therefore configured to be at least partially coupled to each other in the coupled state, while the respective rearward portions are dedicated to be linked to pipelines or hoses, not shown on the drawings. The term "to lock a longitudinal displacement of the first body member relative to the second body member" is intended to indicate that at least the separating movement along the longitudinal axis of the two body members is prevented. In this way, a locking of the two members is provided, which thereby in particular cannot be separated axially. The at least one bayonet pin is engaged with the forward wall of the circumferential notch in such a way that the longitudinal displacement lock of the first body member relative to the second body member is provided due to the lock of the at least one bayonet pin in combination with the circumferential notch.

The term "elastic contact element" can also be understood as, for example, spring (helicoidal, wave spring . . . ), elastic washer, flat gasket, etc., and can be used synonymously. The elastic contact element is elastically deformable, in particular under axial efforts, due to its shape and/or due to its material. The at least one contact portion is longitudinally secured to the filter element. All these terms are intended to indicate that the contact portion of the filter device is configured and adapted to receive the filter element on the one hand and is intended to be placed on a further section between the first front axial surface and the second front axial surface, on the other hand, the filter element being not part of the stack that is axially compressed between the first front axial surface and the second front axial surface. For the purpose of the invention, "filter elements" are all objects or products which are suitable or insertable into a fluid conduit of a coupled first body member and second body member and able to remove some particles from the fluid flowing through the fluid conduit of the filter arrangement. Such filter elements are also known by the terms filter, strainer, etc. The contact portion of such filter devices is preferably configured and adapted to be at least partially circumferential at one longitudinal end of the filter element. Said contact portion advantageously has two opposite longitudinally extending contact surfaces, in order to be placed into longitudinal contact with other parts. Preferably, the entire filter device, i.e., at least the elastic contact element, the filter element and the contact portion, is made of at least one metallic material. The filter element further preferably comprises an external protection part as well as an intermediate support part and further preferably an internal filter material. The filter element covers the whole section of the fluid passage within the longitudinal fluid conduit in the coupled state of the filter arrangement, such that any fluid flows through the filter element when it flows between the rearward portion of the first body member and the rearward portion of the second body member. In preferred embodiments, the filter material is at least partially formed from a metallic mesh. More preferably, the filter element has a substantially conical shape and a conical end which is placed at the opposite longitudinal end of the filter element. The filter material converges in the same direction as the fluid within the longitudinal fluid conduit when the filter arrangement is in the coupled state. In further preferred embodiments, the filter element may have other geometric shapes, for example it may be substantially cylindrical. Particularly preferably, the filter element is configured and adapted rotationally symmetrical to a longitudinal axis of the filter device.

The first body member and the second body member are preferably configured and adapted to be substantially rotationally symmetrical and further comprise preferably cylinder-shaped portions of different diameters. In a preferred embodiment, the first body member and the second body member don't house any valve.

The connecting device embodied as a bayonet connecting device preferably comprises a plurality of bayonet pins and bayonet slots. Further preferably, the number of bayonet pins and bayonet slots is the same, whereby the number of bayonet pins is at least not higher than the number of bayonet slots. In preferred embodiments, six bayonet pins are provided with one of the first body member or the second body member and six bayonet slots are provided with the other of the first body member or the second body member, whereby depending on the size of the corresponding filter arrangement, the corresponding number of bayonet slots and bayonet pins may be higher (for larger filter arrangements) or lower (for smaller filter arrangements), in particular with regard to the diameter, or may be different (a higher number of bayonet slots with regard to the number of bayonet pins).

A preferred embodiment is characterised in that the first body member and the second body member are configured and adapted such that, when the filter arrangement is brought into the coupled state, the first radial sealing surface completely covers the groove of the second radial sealing surface before the at least one bayonet pin is completely circumferentially aligned with the circumferential notch. With the filter arrangement in the coupled state, the first sealing element is thus fully compressed (the forward end of the radial sealing surface has reached or passed the longitudinal level of a rearward wall of the groove and the radial sealing surface completely radially overlaps the groove), creating an effective radial seal between the two body members and providing a sealed fluid conduit from the first fluid conduit and the second fluid conduit. The groove of the second radial sealing surface being completely overlapped by the first radial sealing surface further ensures that the first sealing element provides a complete seal between the longitudinal fluid conduit and the outside of the filter arrangement. In the coupled state, the stack, meaning the at least one contact portion and the at least one elastic contact element, does not have to be fully axially compressed, i.e., the elastic contact element could be further elastically compressed, but the stack is no longer in a free state, thus ensuring the adaptation of the stack at other operating temperatures. The at least partial longitudinal compression of the elastic contact element in the coupled state provides sufficient compliance for the stack without affecting the sealing effect of the first sealing element.

An advantageous development is characterised in that the at least one bayonet slot further comprises an intermediate part between the bayonet entrance and the circumferential notch, the intermediate part being delimited by a forward wall that delimits the intermediate part forward and that is inclined relative to the longitudinal and circumferential directions. The inclined intermediate part of the bayonet slot is preferably characterised by a curved path, which further preferably has an inclination in the range of 40° to 80°, particularly preferably 60° to 70°. In this way, the effort to be applied by the operator for the bayonet connection of the first body member and the second body member with the intervening stack is reduced. The design of the at least one bayonet slot ensures that radial compression of the first sealing element may occurs during a combination of rotational and longitudinal movement between the first body member and the second body member (screwing movement), which is less damaging to the first sealing element, preferably configured as an O-ring and reduces the coupling efforts for the operator.

In a further advantageous configuration of the invention, the intermediate part of the bayonet slot is delimited by a rearward wall that is inclined relative to the longitudinal and circumferential directions, wherein a portion of the rearward wall of the intermediate part axially faces the bayonet entrance. The inclined intermediate part of the at least one bayonet slot (preferably with a cam track of approx. 65°, this angle being considered in the intermediate part between the forward wall and a longitudinal direction crossing the bayonet entrance) contributes to reduce the forces to be exerted by the operator for the bayonet connecting device of the first body member and the second body member with the stack therebetween. In a preferred embodiment, the intermediate part may be formed with different portions having different inclinations (not only approx. 65°). The at least one forward wall and/or the at least one rearward wall of the inclined intermediate part can each have a different inclination from each other. In another preferred embodiment, at least one of the bayonet slots may be an internal slot (facing the longitudinal axis), whereas at least one of the bayonet pins may be an external pin. Preferably, the circumferential notch extends only circumferentially and has thus no so-called overrun, i.e., the forward wall of the circumferential notch, with which the at least one bayonet pin cooperates in the coupled state, is only a longitudinal surface, i.e., perpendicular to the longitudinal axis, and leads directly to the intermediate part of the at least one bayonet slot in the circumferential direction. In this embodiment, the circumferential notch does not restrict the circumferential movement of the at least one bayonet pin within the circumferential notch.

An expedient configuration of the invention is characterised in that in an intermediate state of the bayonet connecting device where the bayonet pin completely axially faces the bayonet entrance and axially abuts against the bayonet slot, the groove is at least partially uncovered, preferably completely uncovered, by the first radial sealing surface, and the at least one contact portion and the at least one elastic contact element are uncompressed (i.e. the at least one elastic contact element is in a free state) between the first axial front surface and the second axial front surface. Radial compression of the first sealing element occurs at least partially, preferably only occurs, with a combination of rotation and longitudinal movement between the first body member and the second body member (screwing movement), which results in material preservation of the first sealing element. This leads on the one hand to improved sealing properties and on the other hand to a long-lasting and durable use of the filter arrangement, which additionally reduces the costs. Preferably, the first radial sealing surface of the first body member and the second radial sealing surface of the second body member are configured such that, when the filter arrangement is brought into the coupled state, at least 33% of the groove is covered before the stack of the filter device is axially compressed between the first axial front surface and the second axial front surface.

In a preferred embodiment, the filter arrangement additionally comprises a second sealing element, wherein, in the coupled state, the second sealing element is in longitudinal contact with the at least one contact portion and with one of the first axial front surface or the second axial front surface, and wherein the filter element mostly extends on the second sealing element side with regard to the at least one contact portion, whereas the at least one elastic contact element extends on the opposite side with regard to the at least one contact portion. Thus, the second sealing element is longitudinally interposed between the contact portion and one of the axial front surfaces and the elastic contact element is longitudinally interposed between the contact portion and the other of the axial front surfaces. In coupled state, the elastic contact element keeps the second sealing element in longitudinal contact with the contact portion. It prevents a liquid from bypassing the filter element, i.e., from circumventing the filter element by flowing externally around the contact portion, if the filter element does not allow sufficient liquid to pass through, for example if it is too dirty. In the coupled state, the elastic contact element dampens potential vibrations and compensates for the geometric changes of the preferably flat sealing element caused by temperature fluctuations. The second sealing element is preferably a flat sealing gasket or an O-ring, and further preferably formed of an elastomer, in particular PTFE. For a secure and slip-free positioning of the second sealing element, the respective axial front surface of the corresponding body member may optionally comprise a groove which partially receives the second sealing element.

According to a further preferred embodiment of the invention, the at least one contact portion is configured and adapted as an annular peripheral flange radially protruding outward with regard to the filter element, wherein, in the coupled state, the annular peripheral flange is longitudinally disposed between the first axial front surface and the second axial front surface. A flange, in particular an annular peripheral flange, provides a favourable contact effect by creating a large and continuous surface area that can be brought into contact with the axial front surfaces and/or with further components of the filter arrangement. In particular, a surface can be created in this way in order to arrange a longitudinal contact with the elastic contact element and/or at least a further sealing element. Both the contact portion and the axial front surfaces are preferably designed as planar longitudinal surfaces in order to provide a preferably contacting configuration and the resulting sealing effect.

A further expedient configuration of the invention is characterised in that the first body member further comprises a radial surface, the radial surface being configured and adapted to directly face the at least one contact portion radially in the coupled state, wherein the diameter of the radial surface is strictly smaller than the diameter of the first radial sealing surface. An advantage of the reduced diameter of the radial surface is that the radial sealing surface is protected from damage by parts of the stack, in particular by the contact portion/flange, during maintenance of the filter device, in particular of the filter element. In this way, damage to the surface of the first radial sealing surface is prevented, for example, when replacing or inserting the filter devices, as the reduced diameter of the radial surface ensures disruption-free maintenance. This prevents in particular the occurrence of scratches, which can have a negative influence on the sealing effect.

A preferred development of the invention is characterised in that the first body member further comprises a first radial guiding surface and the second body member further comprises a second radial guiding surface, wherein the diameter of the first radial guiding surface is bigger than the diameter of the first radial sealing surface and wherein the diameter of the second radial guiding surface is bigger than the diameter of the second radial sealing surface, and that, in the coupled state, the first radial guiding surface and the second radial guiding surface are configured and adapted to engage with reduced radial clearance, and wherein, when the filter arrangement is brought into the coupled state and the first radial sealing surface and the second radial sealing surface face each other radially but the first radial sealing surface completely uncovers the groove, the first radial guiding surface and the second radial guiding surface are configured and adapted to cooperate with each other with reduced radial clearance, allowing a double radial guidance. The radial guiding between the first body member and the second body member, with the first radial guiding surface cooperating with reduced radial clearance with the second radial guiding surface, is effective before the at least one bayonet pin enters the at least one bayonet slot and before start of radial compression of the first sealing element by the first radial sealing surface. The double radial guidance provides a convenient way to precisely fit the second body member into the first body member, allowing the insertion process to be made easier and faster. In this way, in particular, a subsequent crash of the radial sealing surfaces can be avoided or at least reduced by already providing a guiding that is a precise fit. This reduces possible damage to the filter arrangement or at least parts thereof. The double radial guidance between the first body member and the second body member ensures uniform compression of the first sealing element and the entire stack with the corresponding components about the longitudinal axis.

An expedient configuration of the invention is characterised in that the respective body member with which the at least one bayonet pin is secured has at least one recess, the at least one recess extending radially between a radial outer surface and a radial inner surface for housing the at least one bayonet pin, the bayonet pin comprising a retaining ring and a pin rod having at least a head, the head radially facing the radial outer surface, an internal end of the pin rod radially protruding internally with regard to the radial inner surface, and wherein the retaining ring is configured and adapted to be mounted on the internal end for radially securing the pin rod with the respective body member. Preferably, the fastening of the at least one bayonet pin with the first body member is effected on the inner radial side of the first body member. For that purpose, the pin rod is preferably inserted from the external radial side of the first body member into the recess of the first body member until the (pin) head abuts against the outer surface of the first body member. When the pin head abuts the first body member, the pin head is countersunk with regard to the first body member and is protected from any collision with the outside of the filter arrangement. The at least one bayonet pin further preferably comprises a so-called roller or rolling element, which is placed around the internal end of the bayonet pin and is radially secured to the bayonet pin by the retaining ring. The roller and the pin rod can further preferably rotate around their axis relative to the first body member. Since the fixation by the retaining ring is on the inside of the first body member, the parts forming the bayonet pin are protected from the outside and cannot get lost. The at least one bayonet pin can also be arranged on the second body member in a substantially analogous manner. The recess is preferably configured as a radial through-hole.

One advantageous development is characterised in that, in the coupled state, one of the first body member or the second body member partially surrounds the other of the first body member or the second body member and is equipped with at least one through-hole, in particular at least one threaded through-hole, extending radially, to receive a radially movable fixation element, in particular a fixation screw, wherein the fixation element in an external position abuts a radially inner abutment of the respective body member, and wherein the fixation element in an internal position engages the other body member in the coupled state to limit the relative movement of the first body member with regard to the second body member to a configuration in which the at least one bayonet pin is located in the circumferential notch. As there is preferably no longitudinal overrun for the at least one bayonet pin to reach the circumferential notch, the construction preferably comprises a non-rotation device, in particular configured and adapted as the radially movable fixation element to prevent relative rotation between the first body member and the second body member in the coupled state. In the coupled state, the fixation element, in particular the fixation screw, and the at least one bayonet pin cannot be lost from the filter arrangement, which prevents, for example, the airfield from becoming soiled. Furthermore, a reliable use of the filter arrangement is ensured in this way, since the components are not losable and a permanent use is given.

In a further preferred development of the invention, the at least one bayonet slot is configured on an external radial surface of the second body member and the groove is an external groove located axially forward with regard to the at least one bayonet slot. It enables a simple manufacturing of the second body member.

In a further advantageous configuration of the invention, in the coupled state, the fixation element in the internal position engages a fixation hole provided on the radial outer surface of the second body member, the fixation hole being outside the at least one bayonet slot. The outside position of the at least one fastening hole with respect to the at least one bayonet slot leads to the advantageous design that the optimised shape of the at least one bayonet slot is not interfered thereby. In this preferred embodiment, the first body member further preferably comprises at least one threaded bushing that is screwed into the threaded through-hole of the first body member from the external radial side of the first body member until the threaded bushing radially abuts against a radially outer abutment of the first body member. In this abutment position, the threaded bushing is preferably bonded, in particular glued, to the first body member and thus secured. The threaded bushing can thus not get lost. In the preferred embodiment, the fixation screw can be screwed into the threaded bushing from the radially internal side of the first body member. By rotating the fixation screw into the threaded bushing (the radial outer surface of the head of the fixing screw further preferably has a receptacle for this purpose, particularly preferably an hexagonal or torx or any suitable socket for rotating the fixation screw with a wrench), the fixation screw can be radially moved relative to the first body member from the external position (disengaged position), in which the fixation screw abuts against an internal abutment of the threaded bushing and into the internal position in which the threaded part protrudes in the internal radial direction from the internal surface of the first body member. The fixation screw cannot be unscrewed radially out of the first body member from the outer surface of the first body member. In the external position, the threaded part does not protrude in the internal radial direction from the internal surface of the first body member anymore. As the outward movement of the fixation screw is restrained by the internal abutment, the fixation screw cannot be lost. In order to avoid relative rotation between the first body member and the second body member in the coupled state, the fixation screw (internal position) cooperates with the fixation hole. To enable the coupling of the first body member and the second body member, which requires relative rotation, the threaded part has to be in the disengaged position. The radially movable fixation element may also, in a further preferred embodiment, be interchanged with the two body members, in which case the corresponding components must be arranged in a substantially analogous manner.

A further expedient configuration of the invention is characterised in that the elastic contact element is a wave spring. Through the design of the at least one elastic contact element as a wave spring, the friction is reduced when the first body member rotates relative to the second body member, which occurs in particular when the bayonet connecting device is operated. The wave spring is preferably made of at least one metal. Such wave springs are durable and allow reliable adjustment of the desired elastic modulus.

The object is also achieved by the half coupling element comprising a coupling body member and a filter arrangement according to the invention, wherein the half coupling element is configured and adapted to be releasably connected to a complementary half coupling element, the coupling body member comprising a proximal longitudinal portion that is longitudinally attached with the rearward portion of the first body member or of the second body member of the filter arrangement, an internal flow passage that communicates with the longitudinal fluid conduit of the filter arrangement in the coupled state of the filter arrangement, and a distal longitudinal portion that is opposite to the proximal longitudinal portion along the longitudinal axis and that houses at least one valve, wherein the at least one valve is operable between an open position and a closed position of the longitudinal fluid conduit. Using this half coupling element, the filter arrangement can preferably be integrated into a hose unit, thereby providing a half coupling element with a fast, safe and reliably changeable filter device. Such half coupling elements can be used, for example, according to NATO STANAG 3756 or according to NATO STANAG 3105/ISO45, which further increases the reliability of such coupling systems due to the safe coupling capability. The use of such half coupling elements leads to easier and safer handling, which saves costs and makes such missions easier for the operators.

To avoid repetition, reference is made, in the context of the half coupling element according to the invention, to the preferences already set out in detail with respect to the filter arrangement according to the invention. These apply analogously to the half coupling element according to the invention stated below.

BRIEF DESCRIPTION OF THE DRAWINGS

Further expedient and/or advantageous features and developments to the apparatus according to the invention, and also to the method, result from the dependent claims and the description. Particularly preferred embodiments of the apparatus and of the method are described in more detail using the appended drawings. The drawings show:

DETAILED DESCRIPTION OF THE INVENTION

Figure 1:
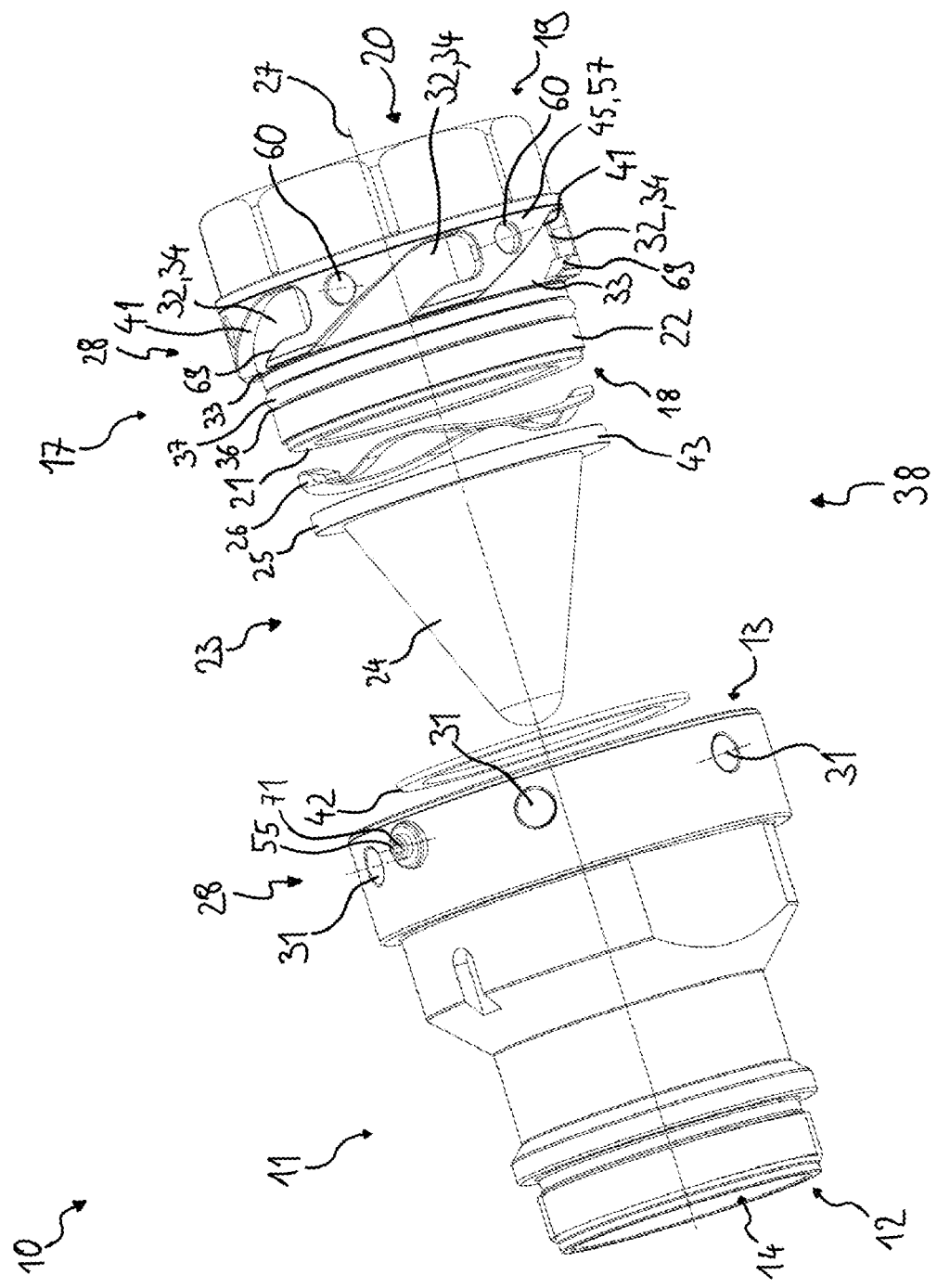
FIG. 1 a schematic explosion view of a filter arrangement according to the invention, FIG. 2a a schematic longitudinal sectional view of the filter arrangement shown in FIG. 1, in an uncoupled state of the filter arrangement, FIG. 2b a schematic cross-sectional view of the filter arrangement shown in FIG. 1 and FIG. 2a, FIG. 3a a schematic side view of the filter arrangement shown in FIG. 1 and FIG. 2 with a partial sectional area, in an intermediate state of the connecting device, FIG. 3b a schematic longitudinal sectional view of the filter arrangement shown in FIG. 3a, in an intermediate state of the connecting device, FIG. 4a a further schematic side view of the filter arrangement shown in FIG. 1 to FIG. 3 with a partial sectional area, in a further intermediate state of the connecting device, FIG. 4b a schematic longitudinal sectional view of the filter arrangement shown in FIG. 4a, in a further intermediate state of the connecting device, FIG. 5a a further schematic side view of the filter arrangement shown in FIG. 1 to FIG. 4 with a partial sectional area, in a further intermediate state of the connecting device, FIG. 5b a schematic longitudinal sectional view of the filter arrangement shown in FIG. 5a, in a further intermediate state of the connecting device, FIG. 6a a schematic side view of the filter arrangement shown in FIG. 1 to FIG. 5 with a partial sectional area, in a coupled state of the filter arrangement, FIG. 6b a schematic longitudinal sectional view of the filter arrangement shown in FIG. 5a, in a coupled state of the filter arrangement, FIG. 6c a detailed view of a section of the filter arrangement shown in FIG. 6b, FIG. 7a a schematic side view of a further embodiment of the filter arrangement according to the invention in an uncoupled state of the filter arrangement, FIG. 7b a schematic longitudinal sectional view of the filter arrangement shown in FIG. 7a, in an uncoupled state of the filter arrangement, FIG. 8a a further schematic side view of the filter arrangement shown in FIG. 7a and FIG. 7b with a partial sectional area, in a coupled state of the filter arrangement, FIG. 8b a further schematic longitudinal sectional view of the filter arrangement shown in FIG. 8a, in a coupled state of the filter arrangement, and FIG. 9 a schematic longitudinal sectional view of a half coupling element according to the invention.

Said figures will be used to describe the filter arrangement according to the invention as well as the half coupling element according to the invention in more detail.

The objects shown in the drawings are depicted by way of example as schematic filter arrangements as well as half coupling elements for tank filling in the airfield or military sector, in particular on the airfield. The invention likewise relates to comparable arrangements of the filter arrangements and half coupling elements which are not associated with the military sector or the airfield.

FIG. 1 to FIG. 9 each schematically depict an embodiment of a filter arrangement 10, comprising a first body member 11 having a forward portion 13 and a rearward portion 12 delimiting a first fluid conduit 14, the first body member 11 comprising a first axial front surface 15 and a first radial sealing surface 16, a second body member 17 having a forward portion 18 and a rearward portion 19 delimiting a second fluid conduit 20, the second body member 17 comprising a second axial front surface 21 and a second radial sealing surface 22. The first body member 11 and the second body member 17 are tubular around a longitudinal axis 27. The first fluid conduit 14 extends across the first body member 11 along the longitudinal axis 27. The second fluid conduit 20 extends across the second body member 17 along the longitudinal axis 27. For example, a pipeline (not shown on the drawings) is linked to a threading of the rearward portion of the first body member 11 and is connected to a tank to be filled whereas a pipeline (not shown on the drawings) is linked to a threading of the rearward portion of the second body member 17 and is connected to a container. FIG. 1 shows an exploded view of the filter arrangement 10, or in other words, the various components of the filter arrangement 10 are in a dismantled state, thus showing them substantially separately. Between the first body member 11 and the second body member 17, FIG. 1 shows a filter device 23 comprising a filter element 24, a contact portion 25 and an elastic contact element 26, wherein the contact portion 25 is adapted and configured to be longitudinally secured to the filter element 24 and preferably to be disposed radially outward with regard to the filter element 24. The elastic contact element 26 is further preferably a wave spring 26. Preferably, in further embodiments, the elastic contact element 26 can be formed by several elastically deformable parts that are adjacent and in longitudinal contact with one another. In FIG. 2a, FIG. 3b, FIG. 4b, FIG. 5b, FIG. 6b, FIG. 7b and FIG. 8b it is shown that the contact portion 25 and the elastic contact element 26 of the filter device 23 are preferably configured as a stack, internally arranged on the first axial front surface 15 of the first body member 11, comprising a wave spring 26. The filter element 24 is thereby arranged in the first fluid conduit 14 and the contact portion 25 engages longitudinally at least partially on the first axial front surface 15, whereby for example a sealing element can be longitudinally arranged therebetween. FIG. 2a shows the second body member 17 outside of the first body member 11 and the elastic contact element 26 in its free state, whereby the first body member 11 and the second body member 17 are in an uncoupled state 38. The arrangement of the filter element 24 in the corresponding fluid conduit 14, 20, is dependent on the direction of the fluid that is flowing through the longitudinal fluid conduit 30. Preferably, the filter element 24 is arranged within the longitudinal fluid conduit 30 in such a way that the direction of flow 70 of the fluid through the filter element 24 is possible.

According to the invention, this filter arrangement 10 is characterised in that the first body member 11 and the second body member 17 are adapted and configured to be complementarily coupled together along the longitudinal axis 27 of the filter arrangement 10 with a connecting device 28, wherein, in a coupled state 29 of the filter arrangement 10, a longitudinal fluid conduit 30 is formed by the first fluid conduit 14 and the second fluid conduit 20 and the filter device 23 is disposed in the longitudinal fluid conduit 30, wherein, in the coupled state 29 of the filter arrangement 10, the contact portion 25 and the elastic contact element 26 of the filter device 23 are at least partially axially compressed between the first axial front surface 15 and the second axial front surface 21, the elastic contact element 26 is at least partially elastically deformed and the elastic contact element 26 is in longitudinal contact with the contact portion 25. The contact portion 25 and the elastic contact element 26 of the filter device 23 are at least partially axially disposed between the first axial front surface 15 and the second axial front surface 21. In view of the simplified illustration of the filter arrangement 10, the filter element 24 in FIG. 1 has a solid body and only the portion of the filter element 24 in the cut plane is shown, whereby the filter element 24, depending on the intended use or fluid or size of particles, dust, pollution to remove, has openings of adapted sizes, which can be produced particularly preferably by means of a mesh, further preferably by means of a metallic mesh. Preferably the filter material can be a 100 mesh. In the coupled state 29, the filter element 24 extends all around a central axis of revolution which is substantially coincident with the longitudinal axis 27. The filter element 24 mostly extends at the level of the rearward portion 12 of the first body member 11.

Figure 8A:
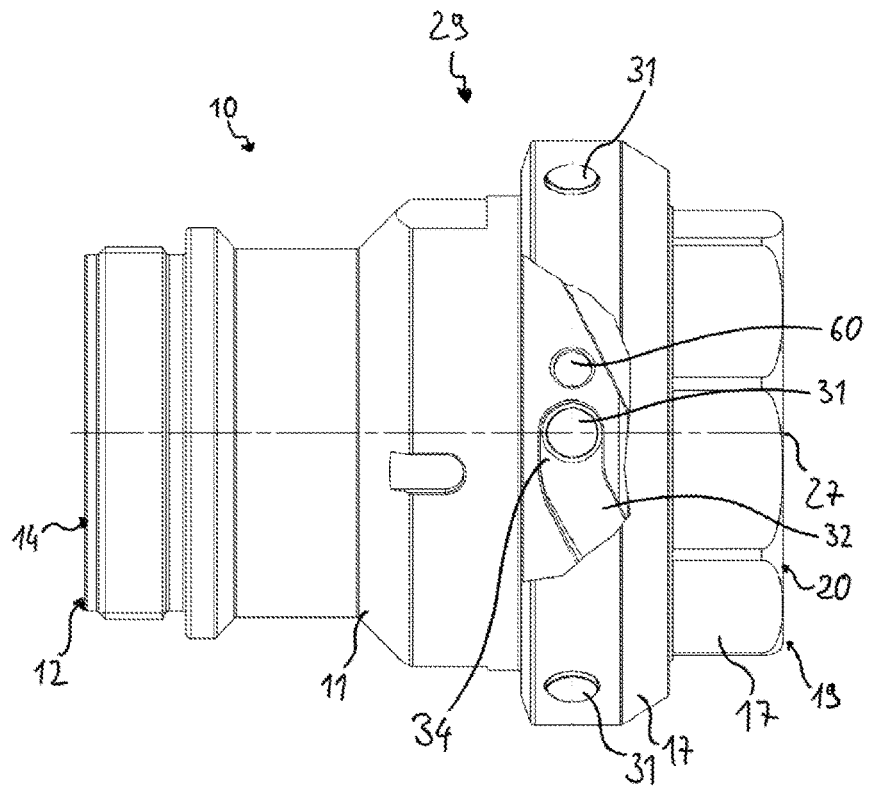
Figure 8B:
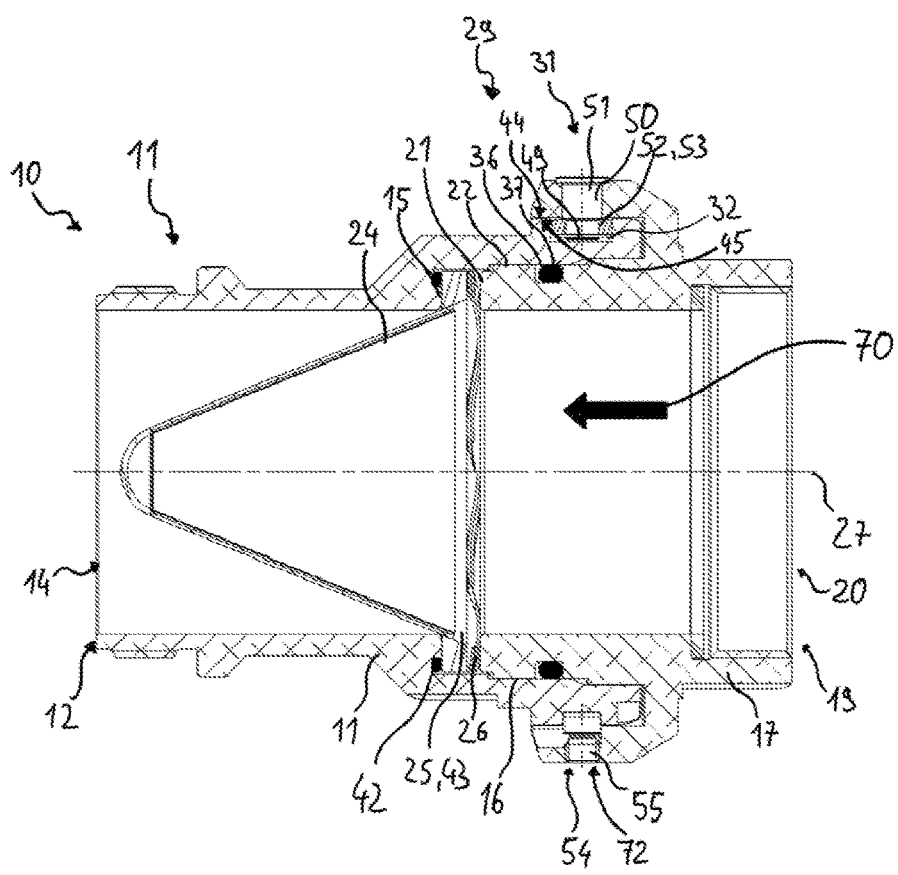
Figure 9:
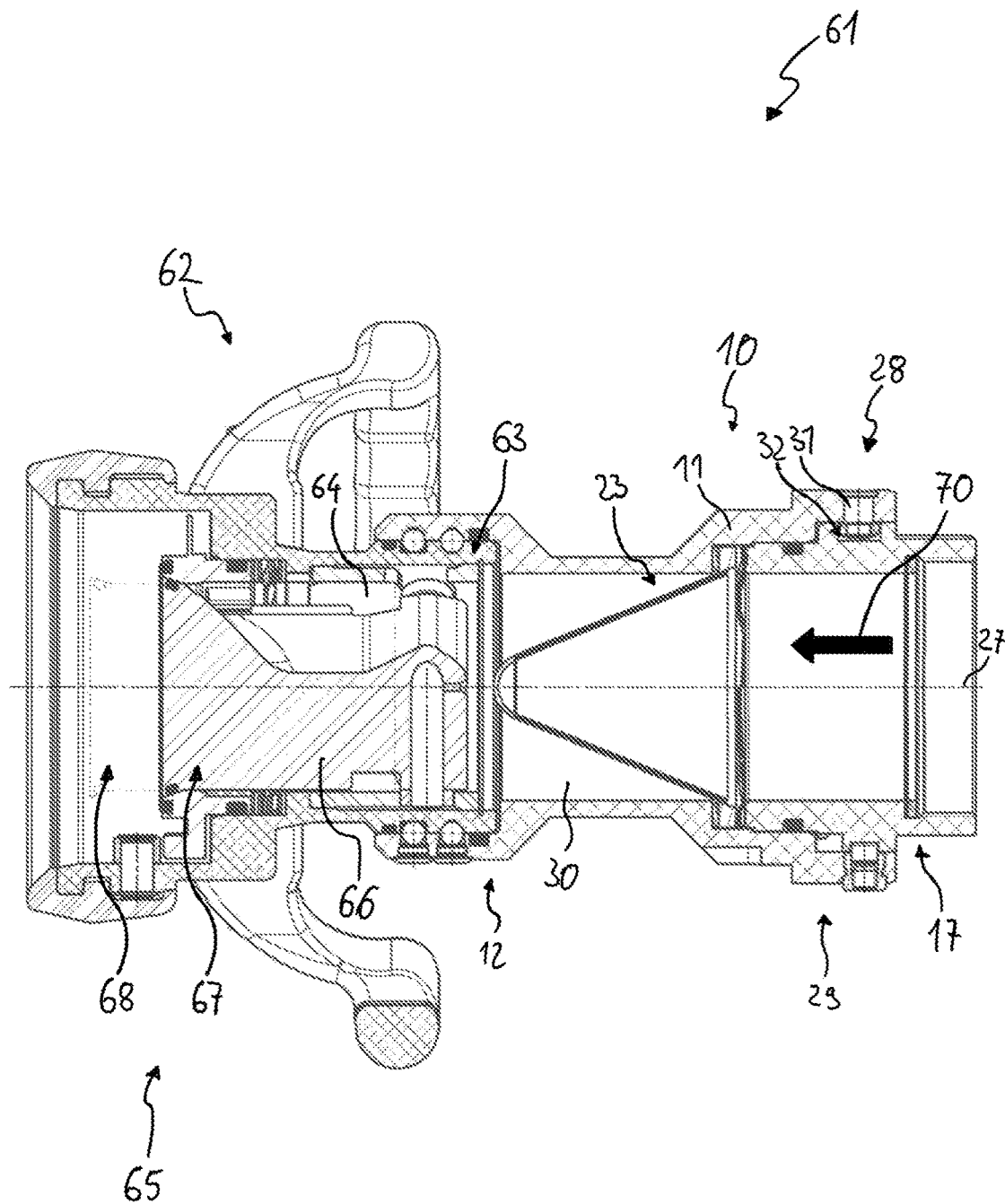

In FIG. 1, the first body member 11 and the second body member 17 are in the completely uncoupled state 38 and, in particular, the components of the filter device 23 are provided without contact with each other. The forward portion 13 of the first body member 11 and the forward portion 18 of the second body member 17 are facing each other. The coupled state 29 of the filter arrangement 10 corresponding to a locked state of the connecting device 28 is shown in FIG. 6, FIG. 8 and FIG. 9, with the first body member 11 and the second body member 17 being connected to each other in a complementary manner along the longitudinal axis 27. In the coupled state 29, the first fluid conduit 14 and the second fluid conduit 20 forms the longitudinal fluid conduit 30 of the filter arrangement 10 with the filter element 24 arranged therein. In the coupled state 29, a radial surface 74 of the first body member 11 being disposed rearwardly with regard to the first radial sealing surface 16 directly faces the contact portion 25 radially, and the diameter of the radial surface 74 is strictly smaller than the diameter of the first radial sealing surface 16. In further preferred embodiments, the radial surface 74 can be arranged on the second body member 17. In the perspective view of FIG. 1, the fluid conduits 14, 20 of the first body member 11 and the second body member 17, which are two separate fluid conduits, are visible. The filter device 23 enables filtering of a—not shown—fluid streaming through the longitudinal fluid conduit 30, in order to filter out possible impurities. The connecting device 28 is configured and adapted as a bayonet connecting device 28 having at least one bayonet pin 31 and at least one bayonet slot 32, wherein each bayonet pin 31 is longitudinally secured with one of the first body member 11 or the second body member 17, and each bayonet slot 32 is arranged on the other of the second body member 17 or the first body member 11 and is configured and adapted to receive one of the bayonet pins 31, wherein each bayonet slot 32 comprises a bayonet entrance 33 and a circumferential notch 34, the circumferential notch 34 being configured and adapted to receive the bayonet pin 31, wherein, in the coupled state 29, the bayonet pin 31 is located in the circumferential notch 34, i.e. is engaged with a forward wall 35 of the circumferential notch 34 of the corresponding bayonet slot 32 to lock a longitudinal displacement between the first body member 11 and the second body member 17, the forward wall 35 delimiting the circumferential notch 34 forward. The first body member 11 or the second body member 17 preferably has a plurality of bayonet pins 31 or bayonet slots 32, as shown in FIG. 1 to FIG. 9. In each of the filter arrangements 10 shown, six bayonet pins 31 and six bayonet slots 32 are provided, although a lower or higher number of bayonet pins 31 and bayonet slots 32 may also be appropriate. In the cross-sectional view of FIG. 2b, the six bayonet pins 31 are shown in detail, whereby the particularly preferred star-shaped positioning, i.e., regular distribution around the longitudinal axis 27, can also be seen here. Further preferred, the bayonet pins 31 and the corresponding bayonet slots 32 are configured and adapted to be essentially congruent in order to provide a reliable fitting accuracy and coupling ability. In the embodiment of the filter arrangement 10 according to the invention shown in FIG. 1 to FIG. 6 and in FIG. 9, the bayonet pins 31 are each arranged on the first body member 11, while the bayonet slots 32 are arranged on the second body member 17. In the embodiment of the filter arrangement 10 according to the invention shown in FIG. 7 and FIG. 8, the bayonet pins 31 are each arranged on the second body member 17, while the bayonet slots 32 are arranged on the first body member 11. The mode of operation as well as the technical sealing effect of the bayonet connecting device 28 is substantially identical to each other. In what follows, the bayonet connecting device 28 and the bayonet coupling with such bayonet connecting device 28 are described for one bayonet pin 31 and its corresponding bayonet slot 32, but this is the same for the other bayonet pins/slots of the bayonet connecting device 28.

Figure 2A:
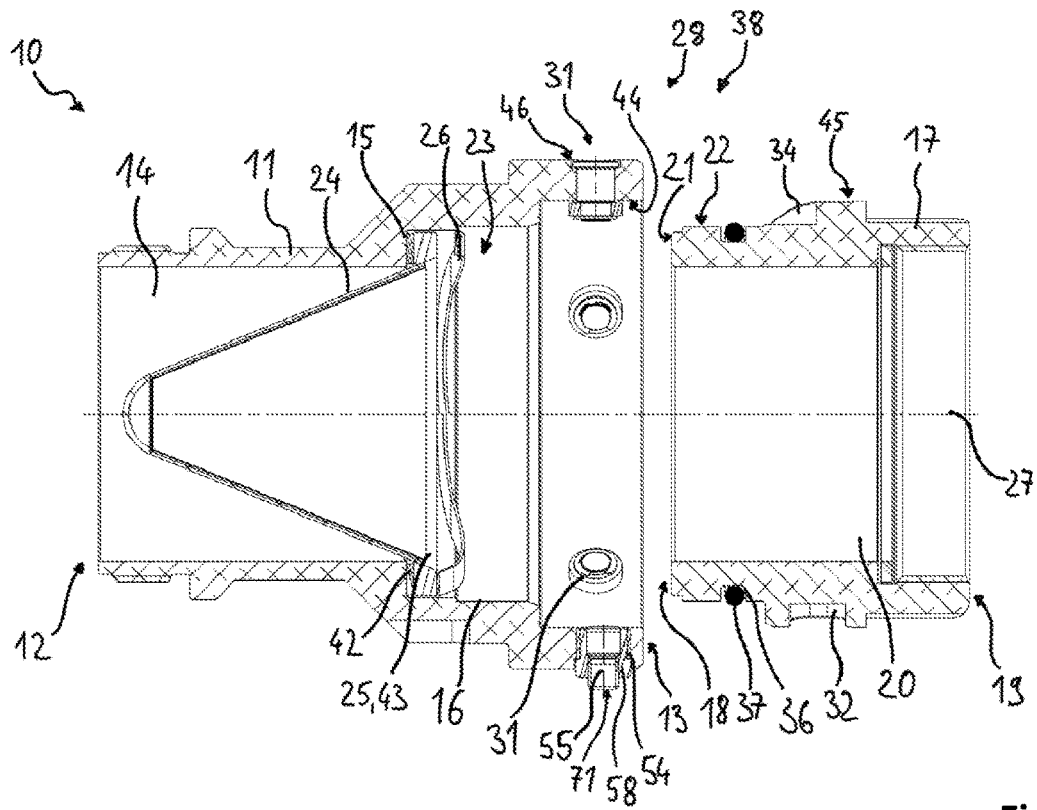
Figure 2B:
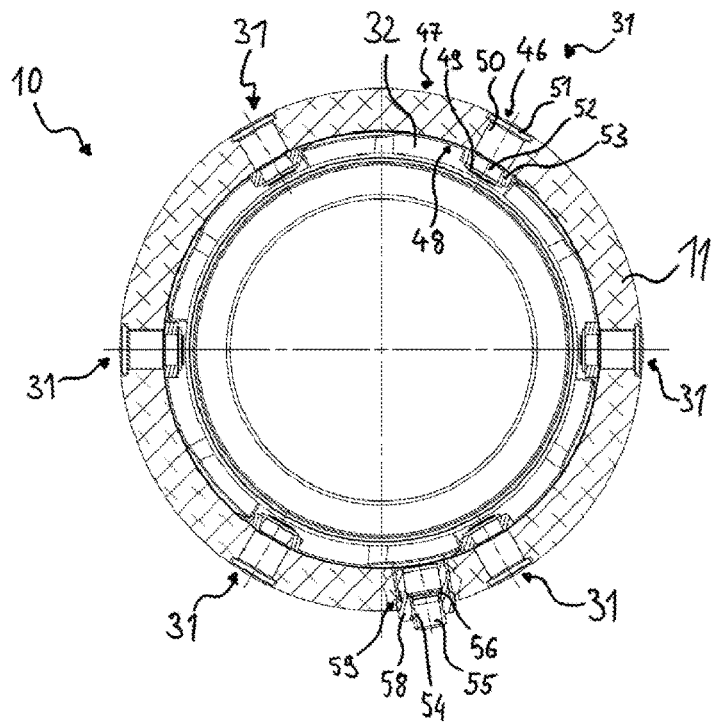
Figure 3A:
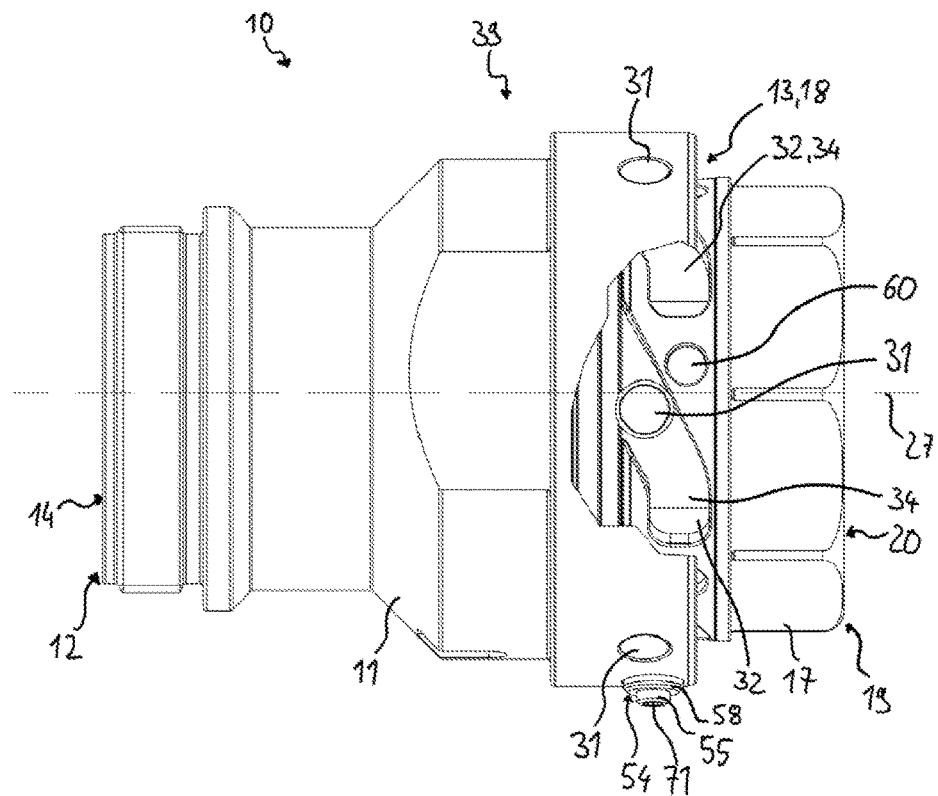
Figure 3B:
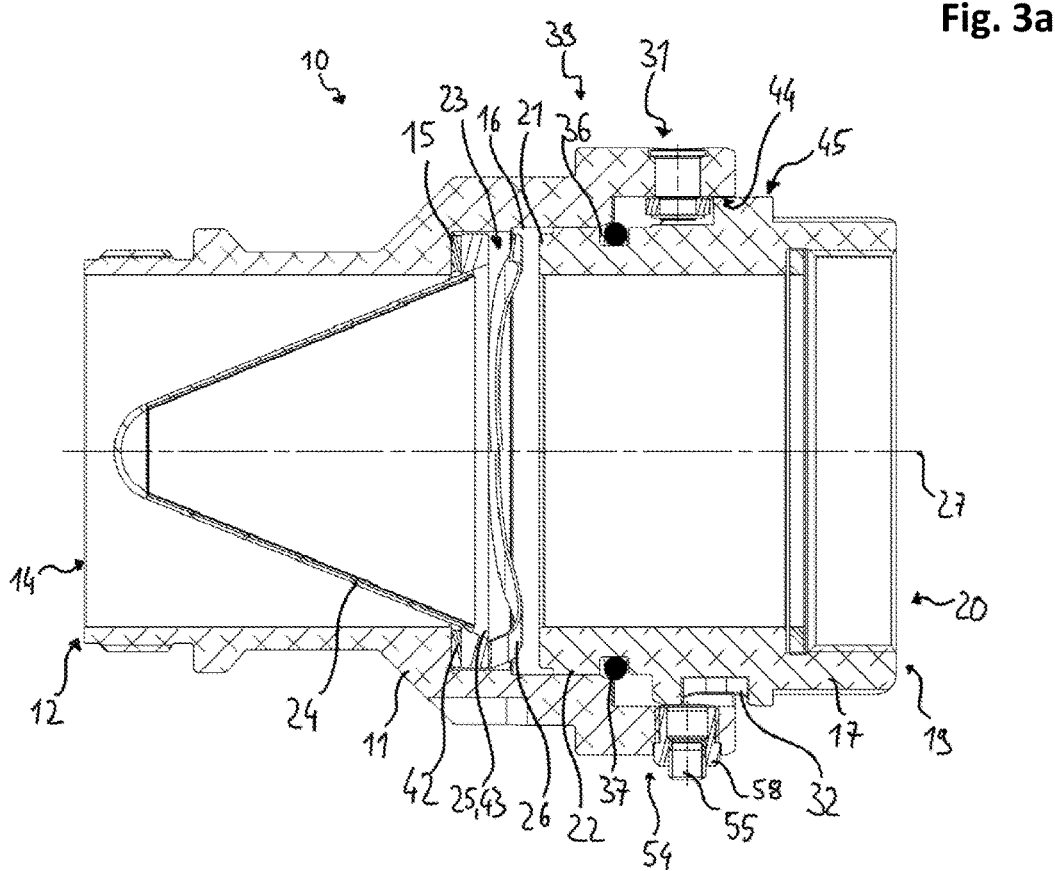
Figure 4A:
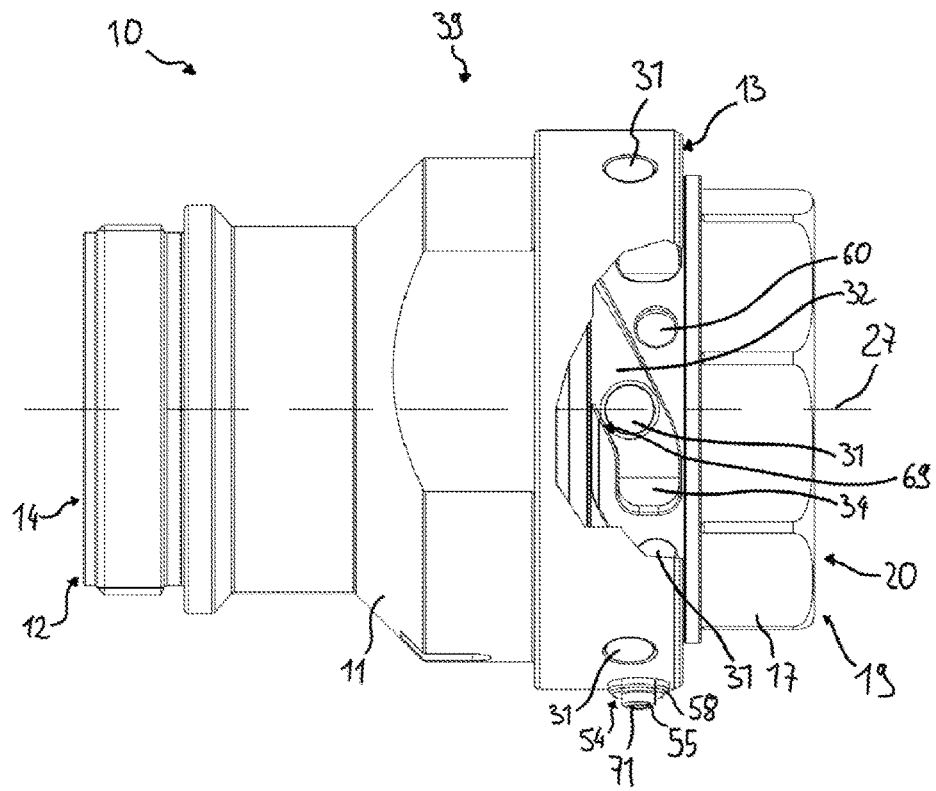
Figure 4B:
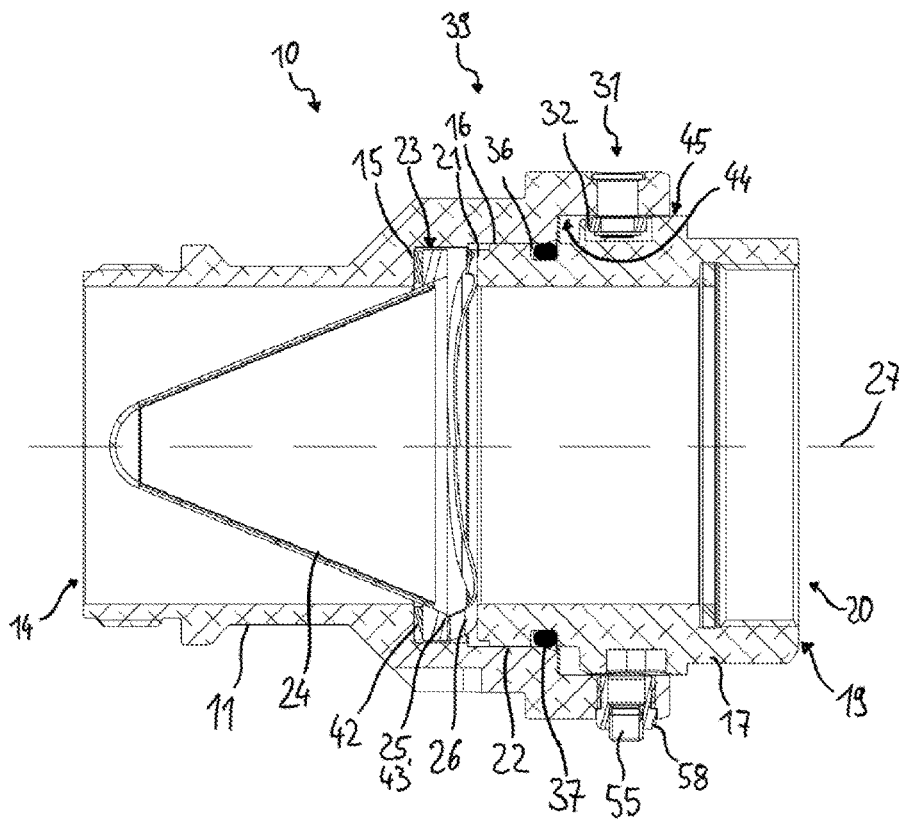
Figure 5A:
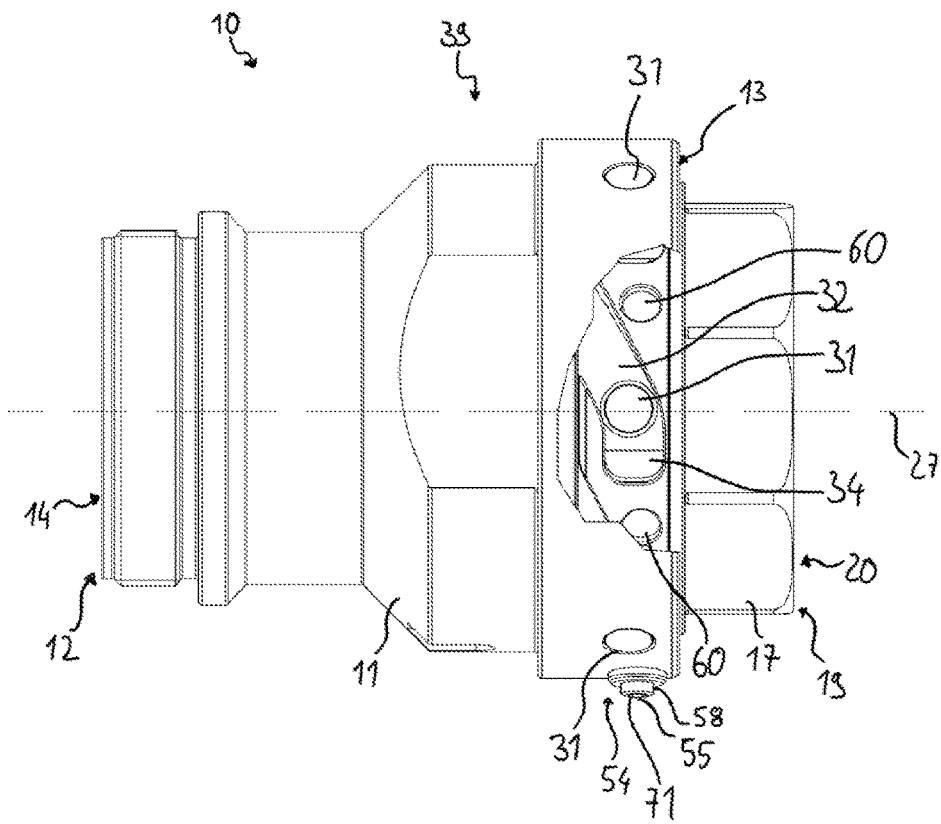
Figure 5B:
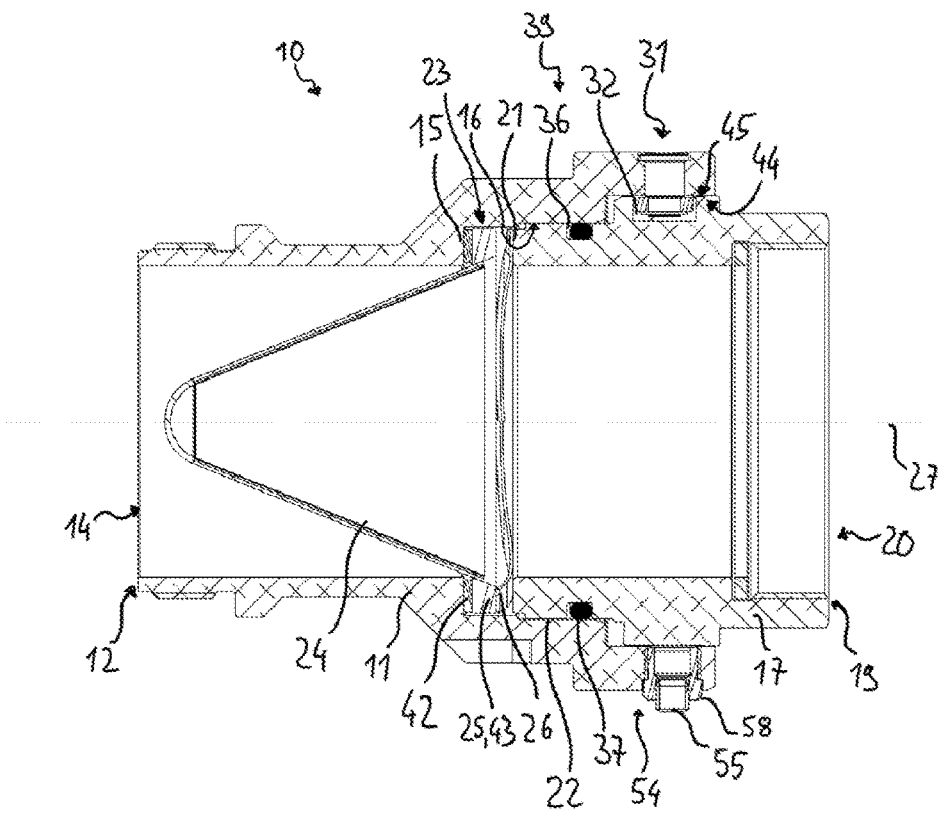
Figure 6A:
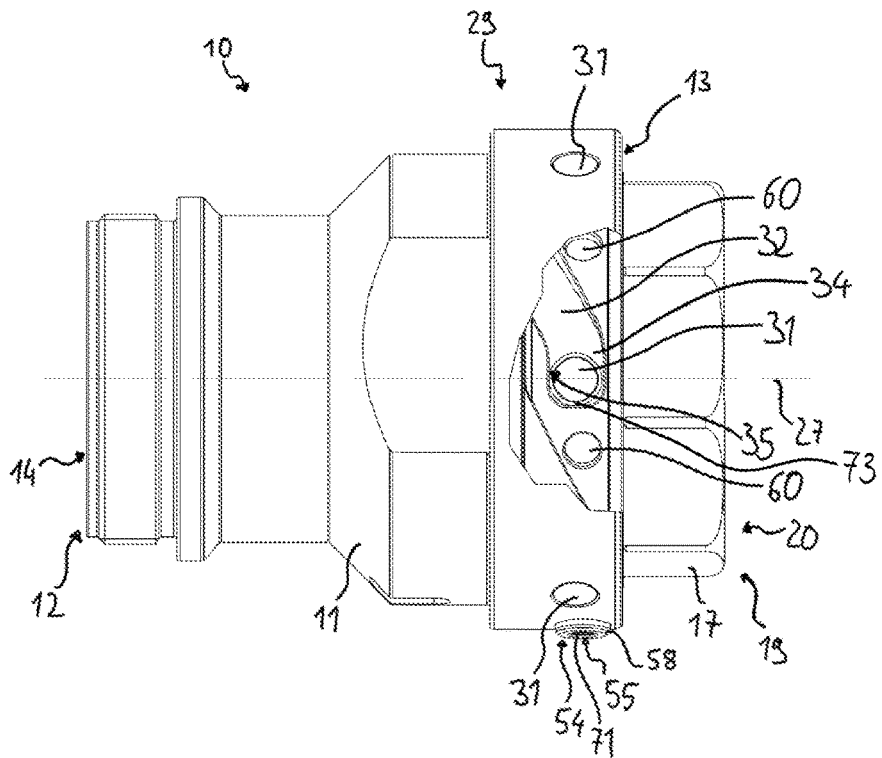
Figure 6B:
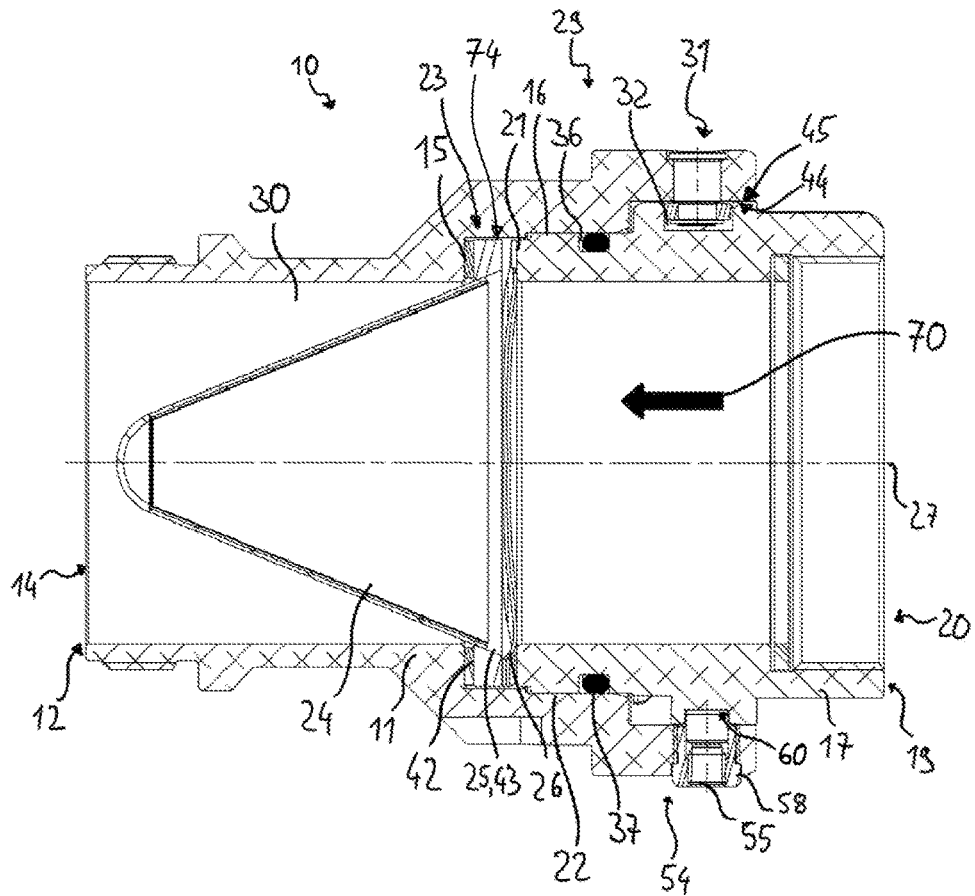

The filter arrangement 10 is further characterised in that the second radial sealing surface 22 of the second body member 17 comprises a groove 36 receiving a first sealing element 37, wherein the first body member 11 and the second body member 17 are configured and adapted such that, when the filter arrangement 10 is brought from the uncoupled state 38 into the coupled state 29 by bringing the bayonet connecting device 28 into the locked state, the first radial sealing surface 16 at least partially radially covers the groove 36 of the second radial sealing surface 22 before the contact portion 25 and the elastic contact element 26 are at least partially axially compressed between the first axial front surface 15 and the second axial front surface 21, and in that, in the coupled state 29, the first sealing element 37 is configured and adapted to seal the longitudinal fluid conduit 30 by radial cooperation with the first radial sealing surface 16 and with the second radial sealing surface 22, the first radial sealing surface 16 completely covering the groove 36. In the coupled state 29, the first radial sealing surface 16 and the second radial sealing surface 22 cooperate with reduced radial clearance, with the first sealing element 37 in-between. The first sealing element 37 is radially interposed and compressed between the first radial sealing surface 16 and the second radial sealing surface 22. The groove 36 is axially delimited by a forward wall and a rearward wall of the second radial sealing surface 22. In FIG. 3 to FIG. 5, especially shown in FIG. 3a, FIG. 4a and FIG. 5a, the filter arrangement 10 is in successive intermediate states 39, meaning that the second body member 17 is partially arranged inside the first body member 11 and each bayonet pin 31 has been at least partially introduced into the corresponding bayonet slot 32, wherein the first radial sealing surface 16 radially cooperates with the second radial sealing surface 22 while, in FIG. 3, the first radial sealing surface 16 does not yet completely radially cover the groove 36. The filter arrangement 10 shown in FIG. 6a and FIG. 6b is in the coupled state 29, with the first radial sealing surface 16 completely radially covering the groove 36 (FIG. 6b) comprising the first sealing element 37. In the coupled state 29, the longitudinal fluid conduit 30 is completely sealed. The longitudinal fluid conduit 30 is adapted to provide a flow 70 for a fluid, as schematically shown in FIG. 6b, FIG. 8b and FIG. 9. In the further embodiment of FIG. 7 and FIG. 8, the arrangement of the bayonet pins 31 and the bayonet slots 32 is interchanged with regard to the first embodiment of FIG. 1 to FIG. 5 as well as FIG. 9, as already mentioned before, so that the coupling process and the configuration of the covering of the groove 36 by means of the first radial sealing surface 16 must be considered interchanged analogously. The corresponding components are therefore interchanged between the first body member 11 and the second body member 17.

Preferably, the first body member 11 and the second body member 17 are configured and adapted such that, when the filter arrangement 10 is brought into the coupled state 29, i.e., when the bayonet connecting device 28 is brought into locked state, the first radial sealing surface 16 completely radially covers the groove 36 of the second radial sealing surface 22 before the bayonet pin 31 is completely circumferentially aligned with the circumferential notch 34. In other words, during the bayonet coupling, the first radial sealing surface 16 completely radially covers the groove 36 of the second radial sealing surface 22 before the bayonet pin 31 completely passes the longitudinal level of the forward wall 35 of the circumferential notch 34. Such a state is shown in more detail in in FIG. 5a and FIG. 5b. As shown by the position of the bayonet pins 31 in FIG. 5a, they are not completely at the level of the circumferential notch 34. It is evident from FIG. 5b, that the first radial sealing surface 16 already completely covers the groove 36 of the second radial sealing surface 22. The bayonet pin 31 is not aligned with the circumferential notch 34 in the circumferential direction. In this further intermediate state 39 of FIG. 5, the first sealing element 37 is totally compressed (the forward end of the first radial sealing surface 16 is at the longitudinal level of the rearward wall of the groove 36 and the first radial sealing surface 16 completely overlaps the groove 36). This creates an effective radial sealing between the two body members 11, 17. The first sealing element 37 ensures tightness between the longitudinal fluid conduit 30 and the outside of the filter arrangement 10. It can further be seen from FIG. 5b that the stack of the filter device 23, comprising at least the contact portion 25 and the elastic contact element 26, is not completely axially compressed but is not in its free state anymore. Preferably, in an intermediate state of the bayonet connecting device 28 where the bayonet pin 31 completely axially faces the bayonet entrance 33 and axially abuts against the bayonet slot 32 (see FIG. 3a), the groove 36 is at least partially uncovered (see FIG. 3b), preferably completely uncovered (see FIG. 3b), by the first radial sealing surface 16, and the contact portion 25 and the elastic contact element 26 are uncompressed (see FIG. 3b) between the first axial front surface 15 and the second axial front surface 21. In this intermediate state of the bayonet connecting device 28 corresponding to the intermediate state 39 of the filter arrangement 10 of FIG. 3, the stack is not axially compressed yet, so that no compression of the contact portion 25 and the elastic contact element 26 between the axial front surfaces 15, 21 occurs. Preferably, in an intermediate state of the bayonet connecting device 28, so long as the bayonet pin 31 is at least partially engaged in the bayonet slot 32 but completely axially faces the bayonet entrance 33, the first sealing element 37 is completely uncovered by the first radial sealing surface 16 and the bayonet pin 31 cannot circumferentially align with the circumferential notch 34. FIG. 3 shows the intermediate state 39 of the filter arrangement 10 with the maximum rapprochement of the first body member 11 and second body member 17, whereas the bayonet pin 31 still completely axially faces the bayonet entrance 33. The progressive radial compression of the first sealing element 37 thus only occurs when the bayonet pin 31 moves in the intermediate part 40 with a combination of rotative and translative relative movement (screwing movement) between the first body member 11 and the second body member 17.

In an advantageous embodiment, the bayonet slot 32 further comprises an intermediate part 40 between the bayonet entrance 33 and the circumferential notch 34, the intermediate part 40 being delimited by a forward wall 69 that is inclined relative to the longitudinal and circumferential directions and that delimits the intermediate part 40 forward. Preferably the intermediate part 40 of the bayonet slot 32 is delimited by a rearward wall 41 that is inclined relative to the longitudinal and circumferential directions and that delimits the intermediate part 40 rearward, wherein a portion of the rearward wall 41 of the intermediate part 40 axially faces the bayonet entrance 33. In the state of the coupling shown in FIG. 3a and FIG. 3b, the bayonet pin 31 is completely axially facing the bayonet entrance 33 (see FIG. 3b), while the bayonet pin 31 axially abuts the rearward wall 41 of the corresponding bayonet slot 32. In this configuration, the bayonet pin 31 can still be axially retracted out of the corresponding bayonet slot 32, whereby the coupling of the two body members 11, 17 by the bayonet connecting device 28 is not secured at this stage.

Further preferably, the filter device 23 additionally comprises a second sealing element 42, the second sealing element 42 and the elastic contact element 26 being at least partially engageable in longitudinal contact with the contact portion 25, wherein the filter element 24 mostly extends on the second sealing element side with regard to the contact portion 25. The second sealing element 42 is at least partially disposed axially between the first axial front surface 15 and the second axial front surface 21. The second sealing element 42 causes the contact portion 25 not necessarily to be directly in contact with the first axial front surface 15, but the second sealing element 42 can be arranged in between. The second sealing element 42 is part of the stack that can be axially compressed between the first axial surface 15 and the second axial surface 21, by at least partial elastic deformation of the second sealing element 42 and of the elastic contact element 26 with regard to their free state of the uncoupled state 38. For example, FIG. 1 to FIG. 9 show an exemplary arrangement of the second sealing element 42. Further preferably, the second sealing element 42 may be arranged in a recess—not shown in detail in the figures—of the first axial front surface 15. In a preferred embodiment, the second sealing element 42 is designed as a (flat) sealing ring, as shown in the exploded view of FIG. 1. In the coupled state 29 (FIG. 6), the stack is axially compressed between the first axial surface 15 and the second axial surface 21, with the second sealing element 42 being sandwiched between the first axial surface 15 and the contact portion 25, and the elastic contact element 26 being sandwiched between the second axial surface 21 and the contact portion 25.

The contact portion 25 is preferably configured and adapted as an annular peripheral flange 43 radially protruding outward with regard to the filter element 24, wherein, in the coupled state 29, the annular peripheral flange 43 is axially disposed between the first axial front surface 15 and the second axial front surface 21. Preferably, the longitudinal dimension of the contact portion 25 is strictly less than the longitudinal dimension of the filter element 24. In particular, the exploded view of FIG. 1 shows the peripheral configuration of the contact portion 25 as an annular peripheral flange 43. In further preferred embodiments, the contact portion 25 can also be configured and adapted to be only partially annular peripheral. In further preferred embodiments, the contact portion 25 can also be configured as a ring surrounding the filter element 24, i.e., the longitudinal dimension of the contact portion is bigger or equal to the longitudinal dimension of the filter element. Preferably, the filter element 24 and the annular peripheral flange 43, are substantially integrally configured, although, for example, the actual filter material (e.g., a metallic mesh) may be a separate item.

In a further advantageous embodiment of the filter arrangement 10 according to the invention, the first body member 11 further comprises a first radial guiding surface 44, which is an inner surface, and the second body member 17 further comprises a second radial guiding surface 45, which is an outer surface, wherein the diameter of the first radial guiding surface 44 is bigger than the diameter of the first radial sealing surface 16 and wherein the diameter of the second radial guiding surface 45 is bigger than the diameter of the second radial sealing surface 22, and that, in the coupled state 29, the first radial guiding surface 44 and the second radial guiding surface 45 are configured and adapted to engage with reduced radial clearance, and wherein, when the first radial sealing surface 16 and the second radial sealing surface 22 cooperate with reduced radial clearance to each other but the first radial sealing surface 16 completely uncovers the groove 36, the first radial guiding surface 44 and the second radial guiding surface 45 are configured and adapted to cooperate with each other with reduced radial clearance. In FIG. 1 and FIG. 2a and FIG. 2b, the radial guiding surfaces 44, 45 are each shown on a filter arrangement 10 in the uncoupled state 38. In the figures of FIG. 3 to FIG. 5, the radial guiding surfaces 44, 45 are already shown at least partially engaged with each other, whereby the second radial guiding surface 45 of the second body member 17 is arranged on the inside of the first radial guiding surface 44 of the first body member 11 based on its smaller diameter. In the figures of FIG. 6a and FIG. 6b, the filter arrangement 10 is in the coupled state 29 such that the first radial guiding surface 44 and the second radial guiding surface 45 are configured and adapted to engage with reduced radial clearance. In the further embodiment of the filter arrangement 10 according to the invention of FIG. 7 and FIG. 8, the embodiment is configured according to the modified arrangement of the bayonet connecting device 28, so that the radial guiding surfaces 44, 45 are interchanged accordingly with the radial guiding surface 44 being an outer surface and the radial guiding surface 45 being an inner surface. An analogous mode of operation is, however, also applicable to this exemplary embodiment.

A further advantageous embodiment of the filter arrangement 10 according to the invention is characterised in that, the bayonet pin 31 is secured to the first body member 11 or to the second body member 17, wherein the respective body member 11, 17 has a recess 46 extending radially between a radial outer surface 47 and a radial inner surface 48 for housing the bayonet pin 31, the bayonet pin 31 comprising a retaining ring 49 and a pin rod 50 having a head 51, the head 51 radially facing the radial outer surface 47, an internal end 52 of the pin rod 50 radially protruding internally with regard to the radial inner surface 48, and wherein the retaining ring 49 is configured and adapted to be mounted on the internal end 52 for radially securing the pin rod 50 with the respective body member 11, 17. In the cross-sectional view of the filter arrangement 10 of FIG. 2b, the corresponding components of the preferred bayonet pin 31 are shown in six-fold configuration. The recess 46 is preferably configured and adapted as a through-hole 46. Preferably, the fastening of the bayonet pin 31 with the corresponding body member 11, 17 is effected on the side of the radial inner surface 48 of the first body member 11. For that purpose, the pin rod 50 is preferably inserted from the side of the radial outer surface 47 of the first body member 11 into the recess 46 of the first body member 11 until the (pin) head 51 abuts against the radial outer surface 47 of the first body member 11. When the pin head 51 radially abuts the first body member 11, the pin head 51 is countersunk with regard to the first body member 11. The bayonet pin 31, in particular internal end 52, further preferably comprises a so-called roller 53 or rolling element 53, which is placed around the internal end 52 of the pin rod 50 and is radially secured to the pin rod 50 by the retaining ring 49. The roller 53 and the pin rod 50 can further preferably rotate around their axis relative to the first body member 11. Since the fixation by the retaining ring 49 is on the side of the radial inner surface 48 of the first body member 11, the parts forming the bayonet pin 31 are protected from the outside of the first body member 11 and from getting lost in the outside of the first body member 11. When the heads 51 of all the bayonet pin 31 abut against the radial outer surface 47 and the second body member 17 is introduced into the first body member 11 with the first sealing element 37 and the bayonet pins 31 at the same longitudinal level, the bayonet pins 31 do not radially interfere with the first sealing element 37 which is in a free state (uncompressed) in the groove 36. The free state of the first sealing element 37 is visible on FIG. 2a and FIG. 3b. In an alternative, the bayonet pins 31 can also be arranged on the second body 17 member in a substantially analogous manner, see FIG. 8b. In FIG. 2b, only one of the bayonet pins 31 is provided exemplarily with the corresponding references. The other bayonet pins 31 are preferably configured in an analogous manner.

Figure 6C:
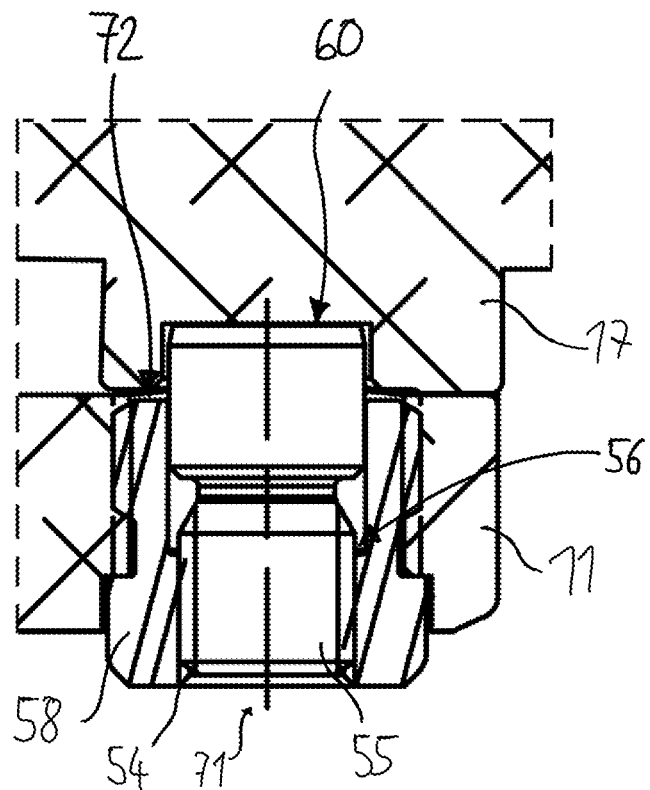
Figure 7A:
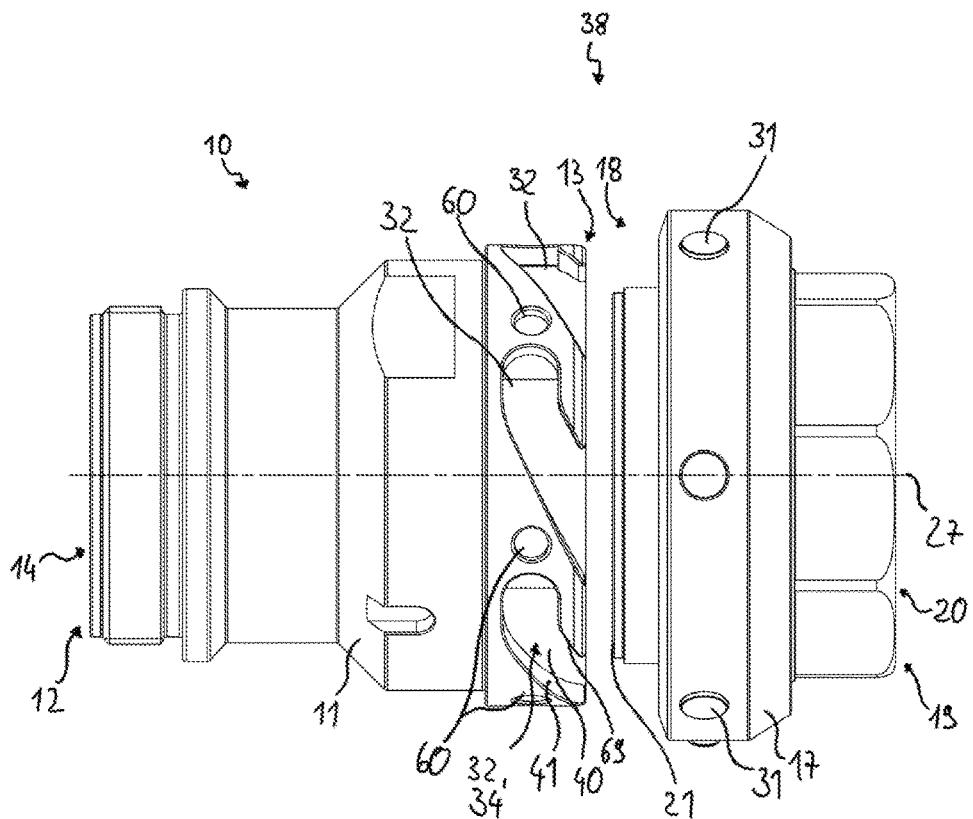
Figure 7B:
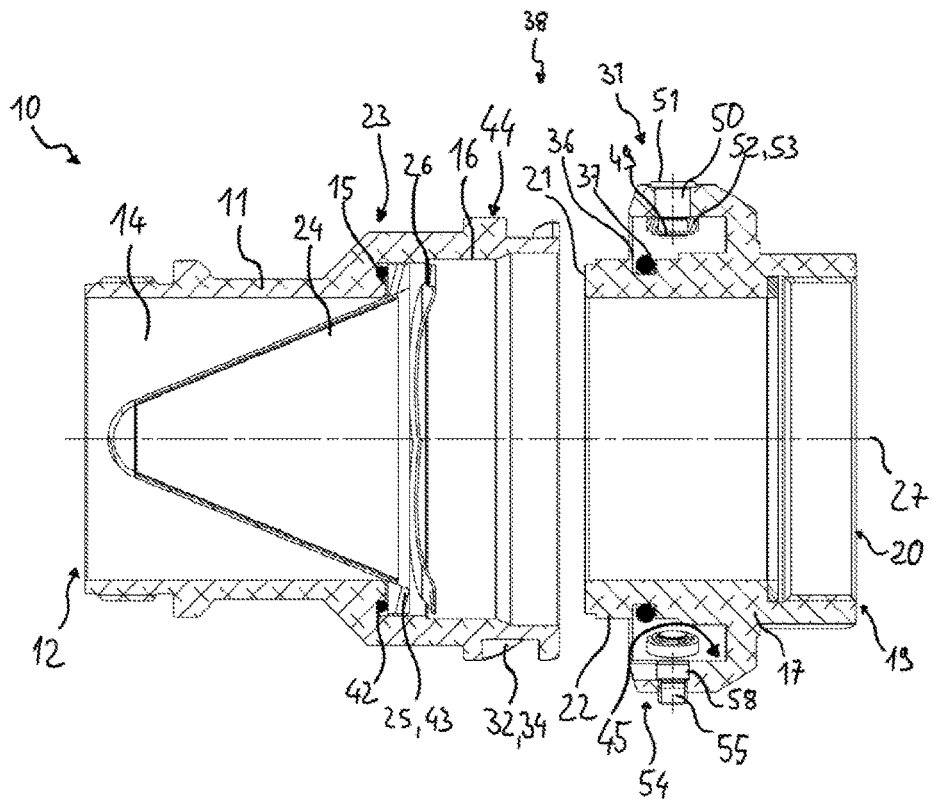

In the coupled state 29, one of the first body member 11 or the second body member 17 preferably partially surrounds the other of the first body member 11 or the second body member 17 and is equipped with at least one through-hole 54, in particular at least one threaded through-hole 54, extending radially, to receive a radially movable fixation element 55, in particular a fixation screw 55, wherein the fixation element 55 in an external position abuts a radially inner abutment 56 of the respective body member 11,17, and wherein the fixation element 55 in an internal position engages the other body member 11, 17 in the coupled state 29 to limit the relative movement of the first body member 11 with regard to the second body member 17 to a configuration in which the bayonet pin 31 is located in the circumferential notch 34 of the corresponding bayonet slot 32. As there is preferably no longitudinal overrun for the bayonet pin 31 to reach the circumferential notch 34, the construction preferably comprises a non-rotation device, in particular configured and adapted as the radially movable fixation element 55 to prevent relative rotation between the first body member 11 and the second body member 17 in the coupled state 29. In the cross-sectional view of the filter arrangement 10 of FIG. 2b, the corresponding components of the preferred fixation element 55 and the through-hole 54 are shown. In this preferred embodiment, the through-hole 54 is arranged on a threaded bushing 58 of the first body member further 11 that is preferably screwed into a threaded through-hole 72 of the first body member 11 from the side of the radial outer surface 47 of the first body member 11 until the threaded bushing 58 radially abuts against a radially outer abutment 59 of the first body member 11. In this abutment position, the threaded bushing 58 is preferably bonded, in particular glued, to the first body member 11. In the preferred embodiment, the fixation element 55 can be screwed into the threaded bushing 58 from the side of the radial inner surface 48 of the first body member 11. By rotating the fixation element 55 into the threaded bushing 58, the fixation element 55 can be radially moved between an external position (disengaged position) (cf. FIG. 3 to FIG. 5), in which the fixation element 55 abuts against the radially inner abutment 56 of the threaded bushing 58 and an internal position (cf. FIG. 6) in which the fixation element 55 protrudes in the internal radial direction from the radial inner surface 48 of the first body member 11. The screwing connection between the fixation element 55 and the threaded bushing 58, i.e., between the fixation element 55 and the first body member 11, enables to radially secure the fixation element 55 with the first body member 11 in the internal position. For the rotation of the fixation element 55 with a wrench, the outer end of the fixation element 55 is provided with a hexagonal socket 71. In FIG. 6c a detailed section of a threaded bushing 58 cooperating with a fixation element 55 is shown. To enable the coupling of the first body member 11 and the second body member 17, which requires relative rotation, the fixation element 55 has to be in the disengaged position (cf. FIG. 3 to FIG. 5). The radially movable fixation element 55 may also, in a further preferred embodiment, be interchanged with the two body members 11, 17, in which case the corresponding components must be arranged in a substantially analogous manner. As shown in FIG. 8b, the radially movable fixation element 55 is received in the corresponding body member and directly screwed into this body member 17, without any intermediate threading bushing like threading bushing 58. In further embodiments, not shown on the figures, one of the fixation element 55 or the threaded through-hole 72 of the corresponding body member has a reverse thread pitch, while the other of the fixation element 55 or the threaded through-hole 72 has a normal thread pitch. It thus avoids potential damages on the bonding of the threaded bushing 58 with the corresponding body member when the fixation element 55 is brought into its external position.

Preferably, the bayonet slot 32 is configured on an external radial surface 57 of the second body member 17 and the groove 36 is an external groove 36 located axially forward with regard to the bayonet slot 32. In particular, the diameter of the external radial surface 57 is strictly bigger than the diameter of the second radial sealing surface 22. Such a preferred embodiment of the bayonet slot 32 and the configuration of the groove 36 is shown in FIG. 1, FIG. 2a, FIG. 3b, FIG. 4b, FIG. 5b, FIG. 6b and in FIG. 9. Further preferably, the external groove 36 is configured and adapted to extend fully circumferential on the second radial sealing surface 22, with the first sealing element 37 also being configured and adapted to be fully circumferential.

In an advantageous embodiment, the fixation element 55 in the internal position engages a fixation hole 60 provided on the radial outer surface 47 of the second body member 17, the fixation hole 60 being outside the bayonet slot 32. Preferably, the second body member 17 comprises a plurality of fixation holes 60, the number of fixation holes 60 substantially corresponding to the number of bayonet pins 31 and/or bayonet slots 32 and preferably being regularly distributed around the central axis. To avoid relative rotation between the first body member 11 and the second body member 17 in coupled state 29, the fixation element 55 is engaged into one of the fixation holes 60, which limits relative movement between the first body member 11 and the second body member 17 and maintains a state in which the bayonet pin 31 is located in the circumferential notch 34.

For all embodiments, when the filter arrangement 10 is brought into the coupled state 29 from the uncoupled state 38 (FIG. 2), the fixation element 55 is brought in external position and each bayonet pin 31 is longitudinally aligned with a bayonet entrance 33 and longitudinally engaged into the bayonet slot 32 through the bayonet entrance 33 (FIG. 3). With the rapprochement of the two body members 11, 17, the first axial surface 15 and the second axial surface 21 are brought longitudinally closer to one another. Then, when the bayonet pin 31 advances toward the circumferential notch 34 in contact with the forward wall 69, the first sealing element 37 is radially compressed by starting covering the groove 36 by the first radial sealing surface 16 whereas the stack is still uncompressed (FIG. 4) and then both compression of the first sealing element 37 and compression of the stack (elastic deformation of the elastic contact element 26 and of the second sealing element 42 with regard to their free state, the stack being in longitudinal contact with the first axial surface 15 on one longitudinal side and with the second axial surface 21 on the opposite longitudinal side) occur. The groove 36 is completely covered, the first sealing element 37 is completely compressed, but the bayonet pin 31 has not reached the circumferential notch 34 yet (FIG. 5). Then to circumferentially align the bayonet pin 31 with the circumferential notch 34, the first body member 11 and the second body member 17 are again moved relative to one another around and along the longitudinal axis, further axially compressing the stack (elastic deformation of the elastic contact element 26 and of the second sealing element 42). There is no further compression of the first sealing element 37. The coupled state 29 is reached (FIG. 6) when the bayonet pin 31 abuts against a bottom surface 73 delimiting the circumferential notch 34 in the circumferential direction. The bayonet connecting device 28 is in the locked state. This bottom surface is formed by a plane perpendicular to the circumferential direction. The fixation element 55 is moved from the external position into the internal position (FIG. 6c). This connecting sequence enables to delink the highest radial compression efforts to exert (first sealing element 37) from the highest longitudinal compression efforts to exert (stack), such that higher efforts can be exerted at each step of the connecting sequence to ensure a tight and safe coupled state 29 at any operating temperature. This connecting sequence also gives better feedback on whether the first sealing element 37 is properly compressed or not.

The half coupling element 61 according to the invention is further described in more detail below using the drawings, in particular FIG. 9. The half coupling element 61 comprising a coupling body member 62 and a filter arrangement 10 according to the invention. The half coupling element 61 is configured and adapted to be releasably connected to a—not shown in detail in the figures—complementary half coupling element. A complementary half coupling element is, for example, a further half coupling element from the area of tank technology, which is designed according to a previously known standard, for example according to NATO STANAG 3756 or according to NATO STANAG 3105/ISO45. The complementary half coupling element can be like the dry-coupling plug-in part described in EP3230645, EP3230646, EP3230647 or EP3230648, whose disclosure content is incorporated herein by reference. The half coupling element 61 according to the invention with the coupling body member 62 comprising a proximal longitudinal portion 63 that is longitudinally attached with the rearward portion 12 of the first body member 11 or with the rearward portion 19 of the second body member 17 of the filter arrangement 10, an internal flow passage 64 that fluidly communicates with the longitudinal fluid conduit 30 of the filter arrangement 10 in the coupled state 29 of the filter arrangement 10, and a distal longitudinal portion 65, opposite to the proximal longitudinal portion 63 along the longitudinal axis 27 and housing at least one valve 66, wherein the at least one valve 66 is at least operable between an open position 68 and a closed position 67 of the longitudinal fluid conduit 30. In FIG. 9, the open position 68 of the valve 66 is shown stylised with dashes, whereby the position of the valve 66 shifts axially towards the proximal longitudinal portion 63 of the coupling body member 62 when it is transferred between the closed position 67 and the open position 68. Thus, in the open position 68, the longitudinal fluid conduit 30 is no longer blocked by the valve 66 and is correspondingly substantially open. In a further preferred embodiment, the movement of the valve 66 can be a translation or a rotation/translation or a rotation with regard to the longitudinal axis 27 of the filter arrangement 10. In the embodiment of the half coupling element 61 according to the invention, the coupling body member 62 of the half coupling element 61 is preferably tubular and longitudinally fixed with the filter arrangement 10 (the coupling body member 62 is centred on an axis that is parallel to the longitudinal axis 27). In particular, the coupling body member 62 of the half coupling element 61 is longitudinally secured with the first body member 11 of the filter arrangement 10 via roller bearing(s) which allow(s) the coupling body member 62 to rotate relative to the first body member 11 (and thus to the second body member 17, in the coupled state 29 of the filter arrangement 10), around the longitudinal axis. In a further preferred embodiment, the half coupling element 61 can be longitudinally fixed with the first body member 11 or the second body member 17 of the filter arrangement 10 by a—not shown—screw connection between a connecting opening of a coupling part and a threading of the rearward portion of the corresponding body member of the filter arrangement 10.

For all embodiments, the uncoupling of the bayonet connecting device 28 from the coupled state 29, for filter device 23 maintenance for example, is done first by retracting the fixation element 55 from its internal position into its external position and then by rotating the first body member 11 relative to the second body member 17 in order to guide the bayonet pin 31 toward the bayonet entrance 33 and to extract each bayonet pin 31 out of the corresponding bayonet slot 32. The first sealing element 37 and the stack are progressively uncompressed and the first sealing element 37, the second sealing element 42 and the elastic contact element 26 return to their free state (FIG. 2).

The invention claimed is:
1. A filter arrangement, comprising:
   a first body member having a forward portion and a rearward portion delimiting a first fluid conduit, the first body member comprising a first axial front surface and a first radial sealing surface;
   a second body member having a forward portion and a rearward portion delimiting a second fluid conduit, the second body member comprising a second axial front surface and a second radial sealing surface;
   at least one filter element and at least one contact portion, wherein the at least one contact portion is configured to be longitudinally secured to the at least one filter element;
   at least one elastic contact element which is elastically deformable;
   the first body member and the second body member being configured to be complementarily coupled together along a longitudinal axis of the filter arrangement with a bayonet connecting device;
   the bayonet connecting device having at least one bayonet pin and at least one bayonet slot;
   wherein the at least one bayonet pin is longitudinally secured with one of the first body member or the second body member; and
   the at least one bayonet slot is arranged on the other of the second body member or the first body member and is configured to receive the at least one bayonet pin;
   wherein the at least one bayonet slot comprises a bayonet entrance and a circumferential notch, wherein, in a coupled state of the filter arrangement, the bayonet pin is engaged with a forward wall of the circumferential notch of the bayonet slot to lock a longitudinal displacement of the first body member relative to the second body member;
   wherein, in the coupled state, a longitudinal fluid conduit is formed by the first fluid conduit and the second fluid conduit and wherein the filter element is disposed in the longitudinal fluid conduit;
   wherein, in the coupled state, the at least one contact portion and the at least one elastic contact element are axially compressed between the first axial front surface and the second axial front surface, the at least one elastic contact element being at least partially elastically deformed and in longitudinal contact with the at least one contact portion;
   the filter arrangement further comprises a first sealing element that is received in a groove of the second radial sealing surface of the second body member;
   wherein the first body member and the second body member are configured such that, when the filter arrangement is brought into the coupled state, the first radial sealing surface at least partially covers the groove of the second radial sealing surface before the at least one contact portion and the at least one elastic contact element are at least partially axially compressed between the first axial front surface and the second axial front surface, and in that, in the coupled state, the first sealing element is configured to seal the longitudinal fluid conduit by radial cooperation with the first radial sealing surface and with the second radial sealing surface, the first radial sealing surface completely covering the groove.

2. The filter arrangement according to claim 1, wherein the first body member and the second body member are configured such that, when the filter arrangement is brought into the coupled state, the first radial sealing surface completely covers the groove of the second radial sealing surface before the at least one bayonet pin is completely circumferentially aligned with the circumferential notch.

3. The filter arrangement according to claim 1, wherein the at least one bayonet slot further comprises an intermediate part between the bayonet entrance and the circumferential notch, the intermediate part being delimited by a forward wall that delimits the intermediate part forward and that is inclined relative to the longitudinal and circumferential directions.

4. The filter arrangement according to claim 3, wherein the intermediate part of the bayonet slot is delimited by a rearward wall that is inclined relative to the longitudinal and circumferential directions, wherein a portion of the rearward wall of the intermediate part axially faces the bayonet entrance.

5. The filter arrangement according to claim 1, wherein in an intermediate state of the bayonet connecting device where the bayonet pin completely axially faces the bayonet entrance and axially abuts against the bayonet slot, the groove is at least partially uncovered, preferably completely uncovered, by the first radial sealing surface, and the at least one contact portion and the at least one elastic contact element are uncompressed between the first axial front surface and the second axial front surface.

6. The filter arrangement according to claim 1, further comprising a second sealing element, wherein, in the coupled state, the second sealing element is in longitudinal contact with the at least one contact portion and with one of the first axial front surface or the second axial front surface, and wherein the filter element mostly extends on the second sealing element side with regard to the at least one contact portion, whereas the at least one elastic contact element extends on the opposite side with regard to the at least one contact portion.

7. The filter arrangement according to claim 1, wherein the at least one contact portion is an annular peripheral flange radially protruding outward with regard to the filter element, wherein, in the coupled state, the annular peripheral flange is longitudinally disposed between the first axial front surface and the second axial front surface.

8. The filter arrangement according to claim 1, wherein the first body member further comprises a radial surface, the radial surface directly facing the at least one contact portion radially in the coupled state, wherein a diameter of the radial surface is strictly smaller than a diameter of the first radial sealing surface.

9. The filter arrangement according to claim 1, wherein:
the first body member further comprises a first radial guiding surface and the second body member further comprises a second radial guiding surface; and
a diameter of the first radial guiding surface is bigger than a diameter of the first radial sealing surface and wherein a diameter of the second radial guiding surface is bigger than a diameter of the second radial sealing surface, and, in the coupled state, the first radial guiding surface and the second radial guiding surface are engaged with reduced radial clearance, and wherein, when the filter arrangement is brought into the coupled state and the first radial sealing surface and the second radial sealing surface face each other radially but the first radial sealing surface completely uncovers the groove, the first radial guiding surface and the second radial guiding surface cooperate with each other with reduced radial clearance.

10. The filter arrangement according to claim 1, wherein the respective body member with which the at least one bayonet pin is secured has at least one recess, the at least one recess extending radially between a radial outer surface and a radial inner surface for housing the at least one bayonet pin, the bayonet pin comprising a retaining ring and a pin rod having at least a head, the head radially facing the radial outer surface, an internal end of the pin rod radially protruding internally with regard to the radial inner surface, and wherein the retaining ring is mounted on the internal end for radially securing the pin rod with the respective body member.

11. The filter arrangement according to claim 1, wherein in the coupled state, one of the first body member or the second body member partially surrounds the other of the first body member or the second body member and is equipped with at least one through-hole extending radially to receive a radially movable fixation element, wherein the fixation element in an external position abuts a radially inner abutment of the respective body member, and wherein the fixation element in an internal position engages the other body member in the coupled state to limit the relative movement of the first body member with regard to the second body member to a configuration in which the at least one bayonet pin is located in the circumferential notch.

12. The filter arrangement according to claim 1, wherein the at least one bayonet slot is configured on an external radial surface of the second body member and the groove is an external groove located axially forward with regard to the at least one bayonet slot.

13. The filter arrangement according to claim 12, wherein in the coupled state, the fixation element in the internal position engages a fixation hole provided on a radial outer surface of the second body member, the fixation hole being outside the at least one bayonet slot.

14. The filter arrangement according to claim 1, wherein the elastic contact element is a wave spring.

15. A half coupling element comprising:
a coupling body member and a filter arrangement according claim 1, wherein the half coupling element is configured to be releasably connected to a complementary half coupling element, the coupling body member comprising:
a proximal longitudinal portion that is longitudinally attached with the rearward portion of the first body member or of the second body member of the filter arrangement;
an internal flow passage that communicates with the longitudinal fluid conduit of the filter arrangement in the coupled state of the filter arrangement; and
a distal longitudinal portion that is opposite to the proximal longitudinal portion along the longitudinal axis of the filter arrangement and that houses at least one valve, wherein the at least one valve is operable between an open position and a closed position of the longitudinal fluid conduit.

* * * * *